United States Patent
Hwang et al.

(10) Patent No.: US 12,126,583 B2
(45) Date of Patent: Oct. 22, 2024

(54) DISPLAY DEVICE AND METHOD FOR SUPPORTING COMMUNICATION BETWEEN DISPLAY DEVICES

(71) Applicant: SAMSUNG ELECTRONICS CO., LTD., Suwon-si (KR)

(72) Inventors: Sungjun Hwang, Suwon-si (KR); Euijun Kim, Suwon-si (KR); Jiyeon Ma, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 17/949,406

(22) Filed: Sep. 21, 2022

(65) Prior Publication Data
US 2023/0179550 A1 Jun. 8, 2023

Related U.S. Application Data

(63) Continuation of application No. PCT/KR2022/012914, filed on Aug. 30, 2022.

(30) Foreign Application Priority Data

Dec. 3, 2021 (KR) .................. 10-2021-0171472

(51) Int. Cl.
*H04L 51/06* (2022.01)
*G06F 3/0482* (2013.01)
(Continued)

(52) U.S. Cl.
CPC ............ *H04L 51/06* (2013.01); *G06F 3/0482* (2013.01); *G06F 3/147* (2013.01); *G06F 3/167* (2013.01);
(Continued)

(58) Field of Classification Search
CPC ..... H04L 51/06; H04L 65/1069; H04L 51/04; H04L 51/043; G06F 3/0482; G06F 3/147;
(Continued)

(56) References Cited

U.S. PATENT DOCUMENTS

| 7,036,083 B1 | 4/2006 | Zenith |
| 2013/0188006 A1 | 7/2013 | McMahon |

(Continued)

FOREIGN PATENT DOCUMENTS

| JP | 6244361 B2 | 12/2017 |
| JP | 2018-156646 A | 10/2018 |

(Continued)

OTHER PUBLICATIONS

International Search Report (PCT/ISA/210) dated Dec. 1, 2022 issued by the International Searching Authority in International Application No. PCT/KR2022/012914.

(Continued)

*Primary Examiner* — Pei Yong Weng
(74) *Attorney, Agent, or Firm* — Sughrue Mion, PLLC

(57) ABSTRACT

In some embodiments, a display device includes a content receiving circuit configured to receive a content signal, a screen configured to display the content signal, a communication interface configured to communicate with other devices via a communication network, a memory storing one or more instructions, and a processor configured to execute the one or more instructions to obtain, from a user, a chatting channel establishment request and counterpart information for establishing a chatting channel; to identify a counterpart display device based on the counterpart information; to obtain an availability state of a chatting counterpart on the counterpart display device; and to perform real-time chatting or non-real-time chatting between the user and the chatting counterpart on the counterpart display
(Continued)

device, based on a determination of whether the availability state of the chatting counterpart on the counterpart display device allows the real-time chatting or the non-real-time chatting.

21 Claims, 29 Drawing Sheets

(51) Int. Cl.
  *G06F 3/147* (2006.01)
  *G06F 3/16* (2006.01)
  *G06V 40/10* (2022.01)
  *G06V 40/20* (2022.01)
  *H04L 65/1069* (2022.01)
(52) U.S. Cl.
  CPC .............. *G06V 40/10* (2022.01); *G06V 40/20* (2022.01); *H04L 65/1069* (2013.01)
(58) Field of Classification Search
  CPC ...... G06F 3/167; G06F 3/011; G06F 3/04842; G06V 40/10; G06V 40/20; H04N 7/183; H04N 7/141; H04N 7/147; G06Q 50/01; H04M 1/72439
  See application file for complete search history.

(56) References Cited

U.S. PATENT DOCUMENTS

| 2015/0026708 A1* | 1/2015 | Ahmed ................ H04N 21/812 725/12 |
| 2017/0142489 A1* | 5/2017 | DeWeese ........... H04N 21/4622 |
| 2022/0159420 A1* | 5/2022 | Egge ................. H04M 1/72457 |

FOREIGN PATENT DOCUMENTS

| KR | 2003-0096455 A | 12/2003 |
| KR | 10-2006-0090448 A | 8/2006 |
| KR | 10-1141223 B1 | 5/2012 |
| KR | 10-2012-0137596 A | 12/2012 |
| KR | 10-1294147 B1 | 8/2013 |
| KR | 10-2014-0110664 A | 9/2014 |
| KR | 10-1685974 B1 | 12/2016 |
| KR | 10-1762930 B1 | 7/2017 |
| KR | 10-1772075 B1 | 8/2017 |
| KR | 10-2017-0127662 A | 11/2017 |
| KR | 10-1882276 B1 | 7/2018 |
| WO | 98/51068 A1 | 11/1998 |
| WO | 2014/036362 A1 | 3/2014 |

OTHER PUBLICATIONS

Written Opinion (PCT/ISA/237) dated Dec. 1, 2022 issued by the International Searching Authority in International Application No. PCT/KR2022/012914.

\* cited by examiner (b)

FIG. 14A
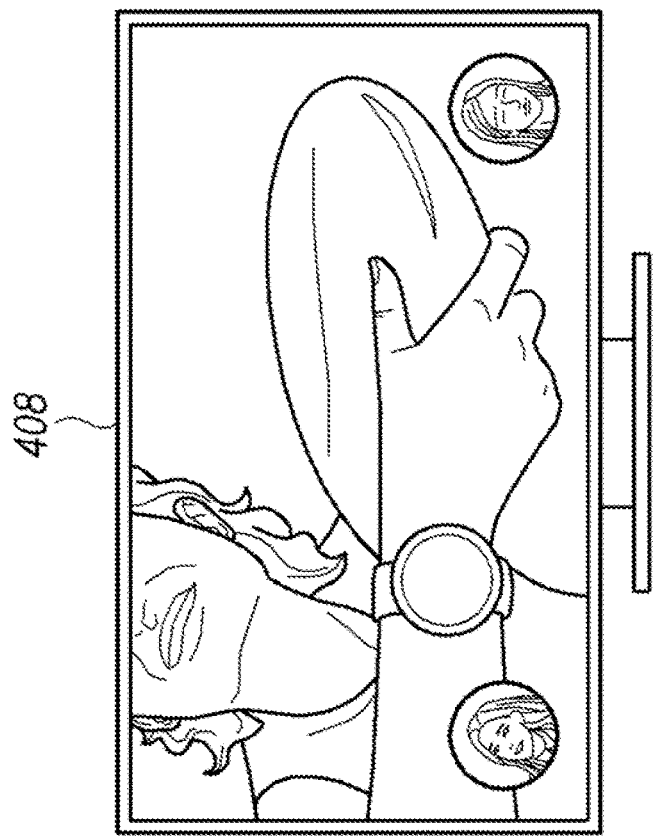
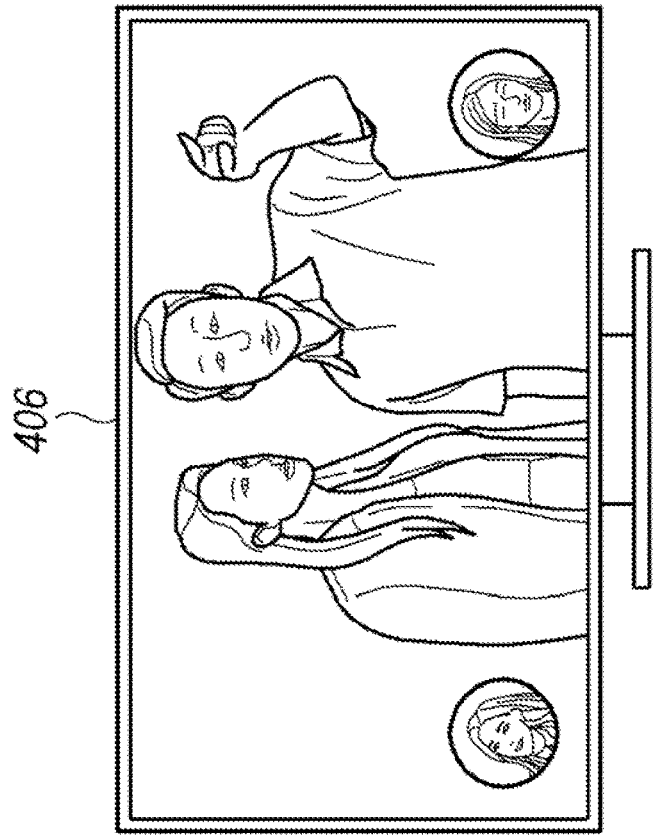

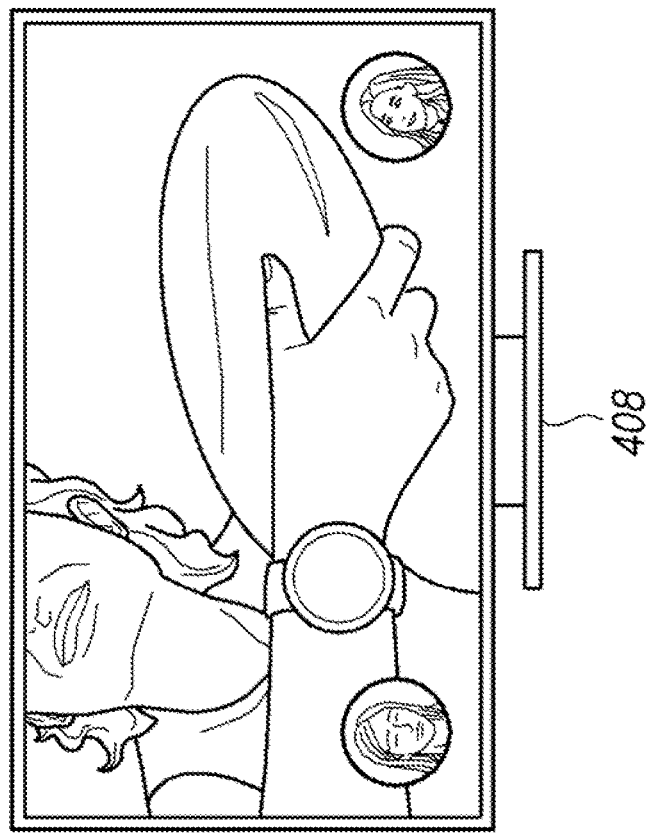
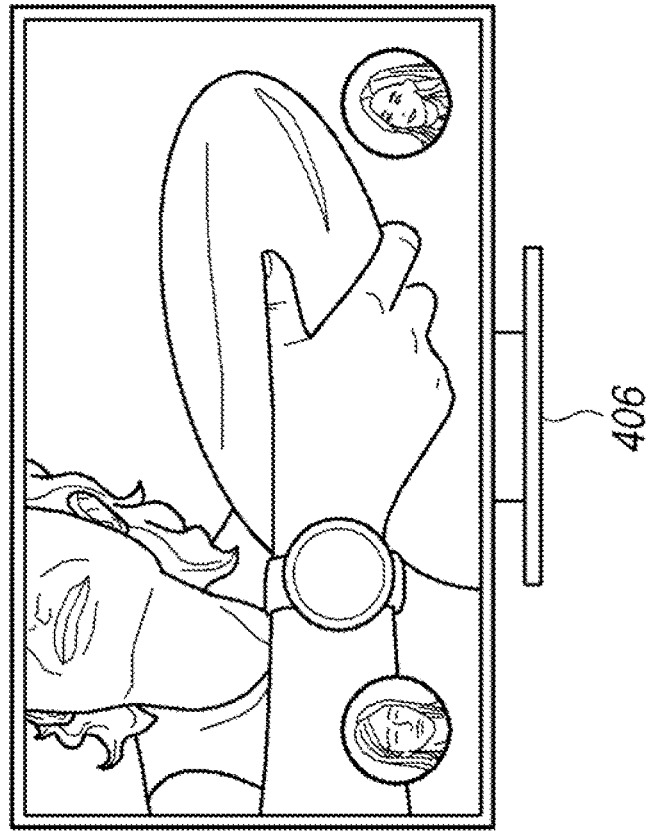
FIG. 14B

DISPLAY DEVICE AND METHOD FOR SUPPORTING COMMUNICATION BETWEEN DISPLAY DEVICES

CROSS REFERENCE TO RELATED APPLICATIONS

This application is a continuation application of International Application No. PCT/KR2022/012914, filed on Aug. 30, 2022, which claims priority from Korean Patent Application No. 10-2021-0171472, filed on Dec. 3, 2021, in the Korean Intellectual Property Office, the disclosures of which are incorporated by reference herein in their entireties.

BACKGROUND

1. Field

The present disclosure relates generally communication between display devices, and more particularly, to a display device and a method for supporting chatting between users using display devices.

2. Description of Related Art

In more and more circumstances, various types of electronic devices arranged in each user space may be connected to each other over a network. Through these electronic devices, many users may attempt to chat with other users according to various methods. For example, there has been proposed a scheme of supporting chatting between users at different locations in a same house, using a voice assistant installed in an electronic device at each of the users' locations.

SUMMARY

According to an aspect of the present disclosure, a display device includes a content receiving circuit configured to receive a content signal, a screen configured to display the content signal, a communication interface configured to communicate with other devices via a communication network, a memory storing one or more instructions, and a processor configured to execute the one or more instructions to obtain, from a user, a chatting channel establishment request and counterpart information for establishing a chatting channel. The processor is further configured to identify a counterpart display device based on the counterpart information. The processor is further configured to obtain an availability state of a chatting counterpart on the counterpart display device. The processor is further configured to perform real-time chatting or non-real-time chatting between the user and the chatting counterpart on the counterpart display device, based on a determination of whether the availability state of the chatting counterpart on the counterpart display device allows the real-time chatting or the non-real-time chatting.

In some embodiments, the display device may further include a voice acquisition circuit configured to receive, from the user, a voice utterance input including the chatting channel establishment request and the counterpart information.

In some embodiments, the counterpart information may comprise identification information that identifies at least one of a person from among a plurality of predetermined persons and a device from among a plurality of predetermined devices.

In some embodiments, the display device may further include at least one of an image acquisition circuit configured to detect an image signal surrounding the display device, a motion information acquisition circuit configured to detect a motion occurring in a vicinity of the display device, and a key input acquisition circuit. In such embodiments, the processor may be further configured to execute the one or more instructions to obtain the chatting channel establishment request, based on a gesture input obtained from at least one of the image signal surrounding the display device the motion occurring in the vicinity of the display device, or the key input.

In some embodiments, the processor may be further configured to execute the one or more instructions to control the screen to display a list of entries respectively indicating each person of the plurality of predetermined persons or each device of the plurality of predetermined devices. The processor may be further configured to obtain the counterpart information from a selected entry from the list of entries according to the gesture input or the key input from the user.

In some embodiments, the processor may be further configured to execute the one or more instructions to, when the chatting channel establishment request comprises a request for a predetermined default device, identify the predetermined default device as the counterpart display device and set the availability state of the chatting counterpart on the counterpart display device to a real-time chatting available state.

In some embodiments, the processor may be further configured to execute the one or more instructions to, when the counterpart information includes identification information of a person from among a plurality of predetermined persons, determine whether the person is located near a device of a plurality of predetermined devices by inquiring, via the communication interface, each device of the plurality of predetermined devices whether the person is located near that device. The processor may be further configured to, based on a determination that the person is located near the device, identify the device as the counterpart display device and set the availability state of the chatting counterpart on the counterpart display device to a real-time chatting available state.

In some embodiments, the processor may be further configured to execute the one or more instructions to, based on a determination that the person is not located near the plurality of predetermined devices, identify a predetermined device related to the person from among the plurality of predetermined devices as the counterpart display device and set the availability state of the chatting counterpart on the counterpart display device to a real-time chatting unavailable state.

In some embodiments, the processor may be further configured to execute the one or more instructions to, when the counterpart information includes identification information of a device from among a plurality of predetermined devices, identify the device as the counterpart display device. The processor may be further configured to query, via the communication interface, to the predetermined device, whether a person is located in a vicinity of the predetermined device. The processor may be further configured to, when a first response that the person is located in the vicinity of the predetermined device is received from the device via the communication interface, set the availability state of the chatting counterpart on the counterpart display device to a real-time chatting available state, and when a second response that the person is not located in the vicinity of the predetermined device is received, set the availability state of the chatting counterpart to a real-time chatting unavailable state.

In some embodiments, the display device may include at least one of a voice acquisition circuit configured to receive a voice utterance input from the user, an image acquisition circuit configured to detect an image signal surrounding the display device, a motion information acquisition circuit configured to detect a motion generated in a vicinity of the display device, and a key input acquisition circuit. In such embodiments, the processor may be further configured to execute the one or more instructions to transmit, to the counterpart display device, a first text message generated based on the voice utterance input received by the voice acquisition circuit, or control the screen to display a plurality of messages, and transmit, to the counterpart display device, a second text message selected from the plurality of messages, based on a gesture input obtained from at least one of the image signal detected by the image acquisition circuit or the motion detected by the motion information acquisition circuit, and the key input obtained from the key input acquisition circuit.

In some embodiments, the processor may be further configured to execute the one or more instructions to, while performing the real-time chatting with the chatting counterpart on the counterpart display device, when the content signal is being displayed on the screen, control the screen to display information of the real-time chatting outside a displayed area of the content signal or in an edge area of the content signal, and when the content signal is not being displayed on the screen, control the screen to display the information of the real-time chatting in a center portion of the screen.

In some embodiments, the information of the real-time chatting displayed on the screen may comprise a chatting message from the user, an image representing the user, a counterpart chatting message from the chatting counterpart, and a counterpart image representing the chatting counterpart or the counterpart display device.

In some embodiments, the processor may be further configured to execute the one or more instructions to, while the user performs the real-time chatting with the chatting counterpart on the counterpart display device, obtain, from the user, a sharing request to share the content signal being displayed on the screen with the counterpart display device, and when an intention to accept the sharing request from the counterpart display device is obtained, perform an operation to share the content signal.

In some embodiments, the operation to share the content signal may comprise to, when the content signal is a terrestrial broadcast content signal or an Over-the-Top (OTT) content signal, transmit information for obtaining the terrestrial broadcast content signal or the OTT content signal to the counterpart display device, and, when the content signal is not the terrestrial broadcast content signal and is not the OTT content signal, stream the content signal being displayed on the screen to the counterpart display device.

In some embodiments, the display device may include an image acquisition circuit configured to obtain an image signal surrounding the display device. In such embodiments, the processor may be further configured to execute the one or more instructions to, in response to a request from another external display device via the communication interface, determine whether a person is located in a vicinity of the display device, based on the image signal obtained by the image acquisition circuit, and transmit, via the communication interface to the another external display device, a result of the determination of whether the person is located in the vicinity of the display device.

In some embodiments, the processor may be further configured to execute the one or more instructions to, determine whether a plurality of persons are located in a vicinity of the display device, according to a predetermined manner, and, based on a determination that the plurality of persons are located in the vicinity of the display device, when a chatting message for the user on the display device is received from another external display device via the communication interface, control the screen to display an indication that the chatting message has been received with its content being hidden.

In some embodiments, the processor may be further configured to execute the one or more instructions to receive, via the communication interface, a chatting message for the non-real-time chatting from another external display device, determine whether a person is present in a vicinity of the display device, according to a predetermined manner, and display the chatting message on the screen based on a determination that the person is present in the vicinity of the display device.

According to an aspect of the present disclosure, a method for supporting chatting between a plurality of display devices connected over a communication network, that is performed by a computer, includes obtaining, from a first display device from among the plurality of display devices, a chatting channel establishment request indicating at least one of a person from among a plurality of pre-registered persons and a second display device from among the plurality of display devices. The method further includes, when the chatting channel establishment request indicates the person from among the plurality of pre-registered persons, searching the plurality of display devices for a display device that is located near the person, based on the searching resulting in identifying that the searched display device is located near the person, supporting real-time chatting between the first display device and the searched display device, and based on the searching resulting in identifying that the searched display device is not located near the person, supporting non-real-time chatting between the first display device and another device from among the plurality of display devices that is associated with the person. The method further includes, when the chatting channel establishment request indicates the second display device from among the plurality of display devices, determining whether a person is located in a vicinity of the second display device, based on determining that the person is located in the vicinity of the second display device, supporting the real-time chatting between the first display device and the second display device, and based on determining that the person is not located in the vicinity of the second display device, supporting the non-real-time chatting between the first display device and the second display device.

In some embodiments, the supporting of the real-time chatting may include displaying a chatting message obtained from both display devices related to the real-time chatting on each screen of the display devices.

In some embodiments, the supporting of the non-real-time chatting may include displaying a chatting message obtained from the first display device on a screen of a counterpart device of the non-real-time chatting, based on determining that the person is located in a vicinity of the counterpart device.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 14A and 14B show an example of a screen of a display device that received a content shared from a counterpart display device during real-time chatting therebetween, according to an embodiment of the present disclosure.

DETAILED DESCRIPTION

Figure 1:
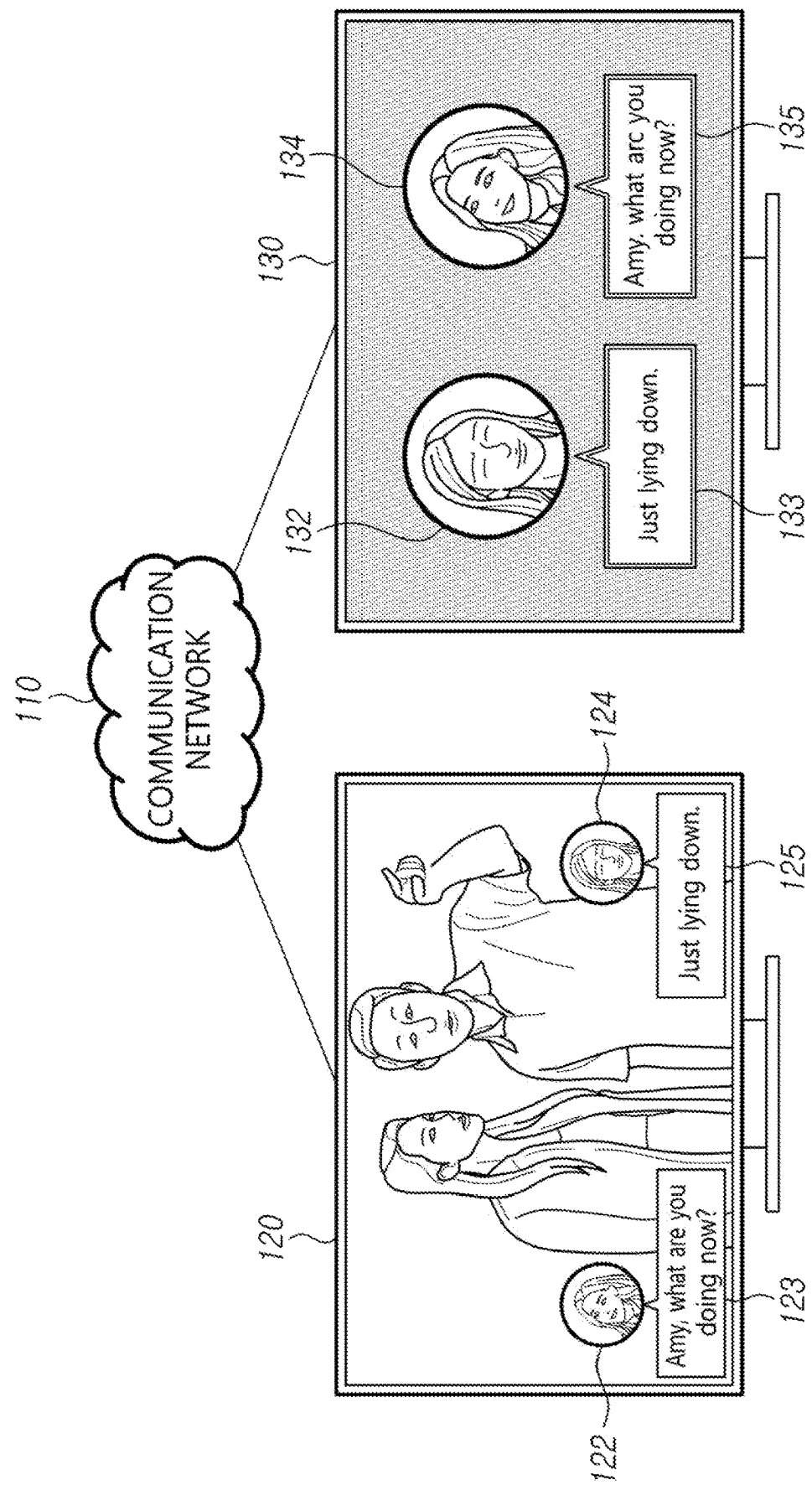
FIG. 1 is a diagram illustrating an exemplary situation in which chatting is performed between users at remote locations, through respective screens of display devices connected over a communication network, according to an embodiment of the present disclosure.

Hereinafter, with reference to the drawings, various embodiments of the present disclosure will be described in detail so that those having ordinary knowledge in the technical field to which the present disclosure pertains can easily implement the disclosed invention. However, the present disclosure may be implemented in several different forms and is not limited to the embodiments described herein. In connection with the description of the drawings, like or similar reference numerals may be used for like or similar components. Further, throughout the drawings and their related descriptions, descriptions of well-known functions and configurations may be omitted for clarity and conciseness.

According to various embodiments of the present disclosure, a user, using a screen of a nearby display device in a space where the user is located, may perform chatting with a counterpart user on another display device. For example, the user may deliver a message at an appropriate time according to an availability state of the counterpart user on the other display device. According to various embodiments of the present disclosure, the user may also perform chatting with the counterpart user on the other device while watching a content on the screen of the display device without interrupting his/her viewing experience of the content. Alternatively or additionally, the user may share the viewing content with the counterpart user while continuing the chatting therewith, in a simple way.

The effects that can be obtained through exemplary embodiments of the present disclosure are not limited to those mentioned above, and other effects not mentioned herein may be clearly derived and understood by those having ordinary knowledge in the technical field to which the exemplary embodiments pertain, from the following description. In other words, any unintended effects according to carrying out the exemplary embodiments of the disclosure may be also derived by those skilled in the art from the exemplary embodiments of the disclosure.

Along with the spread of display devices, a variety of display devices, such as personal or public televisions (TVs), are often installed in many different places in premises (e.g., private spaces such as homes, public spaces such as offices, stores, and the like). To provide a rich and varied user experience, communications between the users using their display devices arranged in respective spaces may be supported. When supporting such communications between the users using their display devices, to provide an optimal user experience, it may be necessary to consider various characteristics related to those display devices. For example, a display device with a large screen (e.g., a TV) may generally be arranged and used in a fixed space, with a main purpose of consuming multimedia contents, and the like.

In aspects of the present disclosure an apparatus and a method are provided for supporting real-time chatting and/or non-real-time chatting using display devices in consideration of an availability state of a chatting counterpart user on a respective display device.

In other aspects of the present disclosure an apparatus and a method are provided for supporting chatting through display devices, in which chatting messages are displayed on a screen of each display device without impairing the user's experience of watching content being displayed on the screen.

FIG. 1 is a diagram illustrating an exemplary situation in which chatting is performed between users at remote locations, through respective screens of display devices connected over a communication network, according to an embodiment of the present disclosure. As shown in FIG. 1, through the screen of each of two display devices 120 and 130 connected over the communication network 110, the users on each of the display devices 120 and 130 may proceed with chatting therebetween.

According to an embodiment of the present disclosure, the communication network 110 may support chatting between the display devices 120 and 130 according to a communication protocol. According to an embodiment of the present disclosure, the communication network 110 may support any short-range wireless communication protocols such as, but not limited to, Bluetooth, wireless local-area network (WLAN), ZigBee, Z-Wave, or the like. According to an embodiment of the present disclosure, the communication network 110 may support any communication protocols such as transmission control protocol/internet protocol (TCP/IP), user datagram protocol (UDP), hypertext transfer protocol (HTTP), HTTP secure (HTTPS), file transfer protocol (FTP), secure FTP (SFTP), message queue telemetry transport (MQTT) or the like. According to an embodiment of the present disclosure, the communication network 110 may also support any wireless communication protocols such as global system for mobiles (GSM), code division multiple access (CDMA), wideband CDMA (WCDMA), worldwide interoperability for microwave access (WiMAX), Long Term Evolution (LTE), LTE advanced (LTE-A), 5th generation mobile network (5G), or 6th generation mobile network (6G). According to an embodiment of the present disclosure, the communication network 110 may generally refer to a plurality of communication networks supporting communications based on a respective communication protocol, and the display devices 120 and 130 may communicate with each other based on one or more communication protocols.

According to an embodiment of the present disclosure, each of the display devices 120 and 130 may be a display device (e.g., TV) that may receive, for example, various multimedia contents for its user from the outside in a wired or wireless manner and play the received contents back on the screen of the display. However, the present disclosure is not limited to such a specific type of display device. According to an embodiment of the present disclosure, the display devices 120 and 130 may be various types of television apparatus, such as a digital TV, a 3D-TV, a smart TV, an light-emitting diode (LED) TV, an organic LED (OLED) TV, a MicroLED TV, a liquid crystal display (LCD) TV, a Mini-LED TV, a Quantum-dot LED, or the like. The present disclosure is not limited thereto. According to an embodiment of the present disclosure, the display devices 120 and 130 may be, for example, devices having various functions to be described later with reference to FIG. 3.

According to an embodiment of the present disclosure, the display device 120 may be a device used by a user A requesting an initiation of chatting with another user. According to an embodiment of the present disclosure, for example, while the user A is watching a multimedia content (e.g., terrestrial broadcasting content) using the screen of his/her display device 120, he or she may request chatting with a counterpart user B via the display device 120, according to a predetermined scheme. According to an embodiment of the present disclosure, a chatting channel may be established between the display device 120 and the display device 130 based on a request from the user A. In such a circumstance, as shown in FIG. 1, while the multimedia content being watched by the user A is continuously displayed on the screen of the display device 120, an image 122 of the user A (who is one party of the chatting) and a message 123 transmitted from the user A to the user B may be displayed on a part of a lower edge of the screen of the display device 120 (e.g., in the lower left corner of the screen), and an image 124 of the user B (who is the other party of the chatting) and a message 125 transmitted from the user B to the user A may be displayed on other part of a lower edge of the screen of the display device 120 (e.g., in the lower right corner of the screen).

According to an embodiment of the present disclosure, each of a user A's image 122 and a user B's image 124 may be a predetermined still image (e.g., a user A's profile picture and a user B's profile picture). According to another embodiment of the present disclosure, each of the user A's image 122 and the user B's image 124 may be a moving picture captured in real time by the display device 120 and the display device 130, respectively. The present disclosure is not limited to a specific form thereof. According to an embodiment of the present disclosure, the image 122 of the user A and the message 123 from the user A, and the image 124 of the user B, and the message 125 from the user B may be arranged, as shown in FIG. 1, in a relatively small size, out of an area or at its edge where the content is displayed on the screen of the display device 120 so as not to interfere with the user A's viewing experience of the content as much as possible.

According to an embodiment of the present disclosure, the display device 130 may be a device used by the counterpart user B to initiate a chatting in response to a request for chatting from the user A. According to an embodiment of the present disclosure, for example, the user B may be located near his or her own display device 130 while not watching any multimedia content using the screen of the display device 130. The user B and may receive the request for chatting from the user A via the display device 130. According to an embodiment of the present disclosure, when a chatting channel is established between the display device 120 and the display device 130 based on the request from the user A, as shown in FIG. 1, an image 132 of the user B (who is a counterpart of the chatting) and a message 133 transmitted from the user B to the user A may be displayed on a center part of the screen of the display device 130 (e.g., to the left of the center part of the screen). An image 134 of the user A (who is the other counterpart of the chatting) and a message 135 from the user A to the user B may be displayed on a center part of the screen of the display device 130 (e.g., to the right of the center part of the screen).

According to an embodiment of the present disclosure, the image 132 of the user B and the message 133 from the user B and the image 134 of the user A and the message 135 from the user A displayed on the screen of the display device 130 may respectively correspond to the image 124 of the user B and the message 125 from the user B and the image 122 of the user A and the message 123 from the user A displayed on the screen of the display device 120. However, the present disclosure is not limited thereto. According to another embodiment of the present disclosure, for example, the image 122 of the user A and the image 124 of the user B displayed on the screen of the display device 120 may be a still image (e.g., each profile picture), respectively. The image 134 of the user A and the image 132 of the user B displayed on the screen of the display device 130 may be a video captured in real time by the display devices 120 and 130, unlike the images 122 and 124. The present disclosure is not limited to a specific form. According to an embodiment of the present disclosure, the image 132 of the user B and the message 133 from the user B, and the image 134 of the user A and the message 135 from the user A displayed on the screen of the display device 130 may be displayed, as shown in FIG. 1, in a relatively larger size at the center part of the screen of the display device 130 so as to increase the concentration of chatting by the user B.

Although FIG. 1 illustrates a circumstance in which chatting is performed via both the display devices in a state that a multimedia content is displayed on the screen of the display device 120 while no multimedia content is displayed on the screen of the display device 130. The present disclosure is not limited thereto. According to another embodiment of the present disclosure, chatting may be performed via both the display devices 120 and 130 even in a state that each of the display devices 120 and 130 displays multimedia contents on its own screen or neither of those display devices displays a multimedia content.

Figure 2:
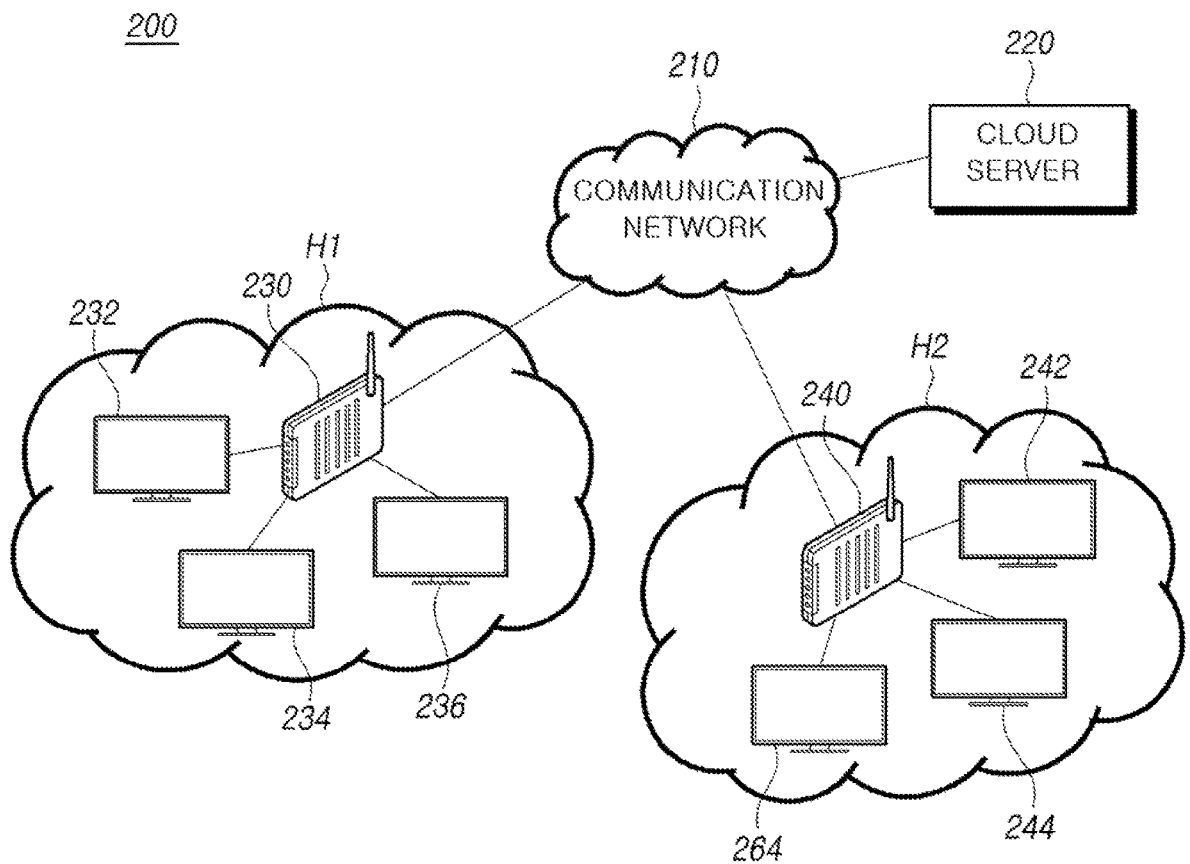
FIG. 2 is a diagram schematically illustrating a network environment supporting chatting through display devices, according to an embodiment of the present disclosure.

FIG. 2 is a diagram schematically illustrating a network environment supporting chatting through display devices according to an embodiment of the present disclosure. As shown in FIG. 2, the network environment 200 may include in-house networks H1 and H2 and a cloud server 220 each connected via an external communication network 210.

According to an embodiment of the present disclosure, each of the in-house network networks H1 and H2 may include a home network hub 230 and a plurality of in-house devices 232, 234 and 236 connected thereto or a home network hub 240 and a plurality of in-house devices 242, 244 and 246 connected thereto. In FIG. 2, although it is illustrated that the in-house devices 232, 234 and 236 of the in-house network H11 or the in-house devices 242, 244 and 246 of the in-house network H2 are television apparatuses installed at different locations within each house. The present disclosure is not limited thereto. According to various embodiments of the present disclosure, it is illustrated that various types of electronic devices in each of the in-house networks H1 and H2 may be respectively connected to the home network hub 230 or 240 via a predetermined wired/wireless short-range communication protocol, such as Bluetooth, near field communication (NFC), WLAN, Zigbee, Z-wave or Ethernet, high-definition multimedia interface (HDMI), universal serial bus (USB), and the like. However, the present disclosure is not limited to a specific form.

According to an embodiment of the present disclosure, each of the home network hubs 230 or 240 may be a gateway or server device relaying communications for the in-house devices 232, 234 and 236 or the in-house devices 242, 244 and 246 connected to the corresponding in-house network H1 or H2, respectively. According to an embodiment of the present disclosure, each of the home network hubs 230 and 240 may support chatting in between the in-house devices 232, 234 and 236 or the in-house devices 242, 244 and 246 connected to the corresponding home network H1 or H2, respectively. According to an embodiment of the present disclosure, the home network hub 230 may support the in-house devices 232, 234, and 236 connected to the in-house network H1 to communicate with the cloud server 220 via the external communication network 210, or with an external device such as the in-house devices 242, 244 and 246 connected to another in-house network H2 or another communication device (not shown) directly connected to the external communication network 210. Similarly, the home network hub 240 may support the in-house devices 242, 244, and 246 connected to the in-house network H2 to communicate with the cloud server 220 through the external communication network 210 or with an external device such as the in-house devices 232, 234 and 236 connected to the other in-house network H1 or another communication devices (not shown) directly connected to the external communication network 210.

Although FIG. 2 and its related description as above have been made, for instance, focusing a circumstance in which the communication is made via the corresponding home network hub 230 or 240 when the in-house devices 232, 234, 236, 242, 244 and 246 communicate with each other or communicate with the outside through the external communication network 210. The present disclosure is not limited thereto. According to another embodiment of the present disclosure, each of the in-house devices 232, 234, 236, 242, 244 or 246 may communicate directly with each other or communicate with the outside through the external communication network 210, without passing through the home network hub 230 or 240.

According to an embodiment of the present disclosure, the external communication network 210 may support any communication protocol such as TCP/IP, UDP, HTTP, HTTPS, FTP, SFTP, MQTT or the like. The present disclosure is not limited thereto. According to an embodiment of the present disclosure, the external communication network 210 may also support any wireless communication protocol, such as GSM, CDMA, WCDMA, WiMAX, LTE, LTE-A, 5G, or 6G. The present disclosure is not limited to a specific form thereof.

According to an embodiment of the present disclosure, the cloud server 220 may receive information directly from each of the in-house devices 232, 234, 236, 242, 244 or 246 or through each home network hub 230 or 240. According to an embodiment of the present disclosure, the cloud server 220 may generate new information (e.g., control information) based on the received information to transmit the information to each of the in-house devices 232, 234, 236, 242, 244 or 246. According to an embodiment of the present disclosure, the cloud server 220 may include, for example, a content providing server (e.g., an internet protocol television (IPTV) server, an over-the-top (OTT) server, etc.). The present disclosure is not limited to a specific form. According to an embodiment of the present disclosure, the cloud server 220 may transmit a multimedia content to a corresponding device through the external communication network 210 in response to a request from each of the in-house device 232, 234, 236, 242, 244 or 246.

Figure 3:
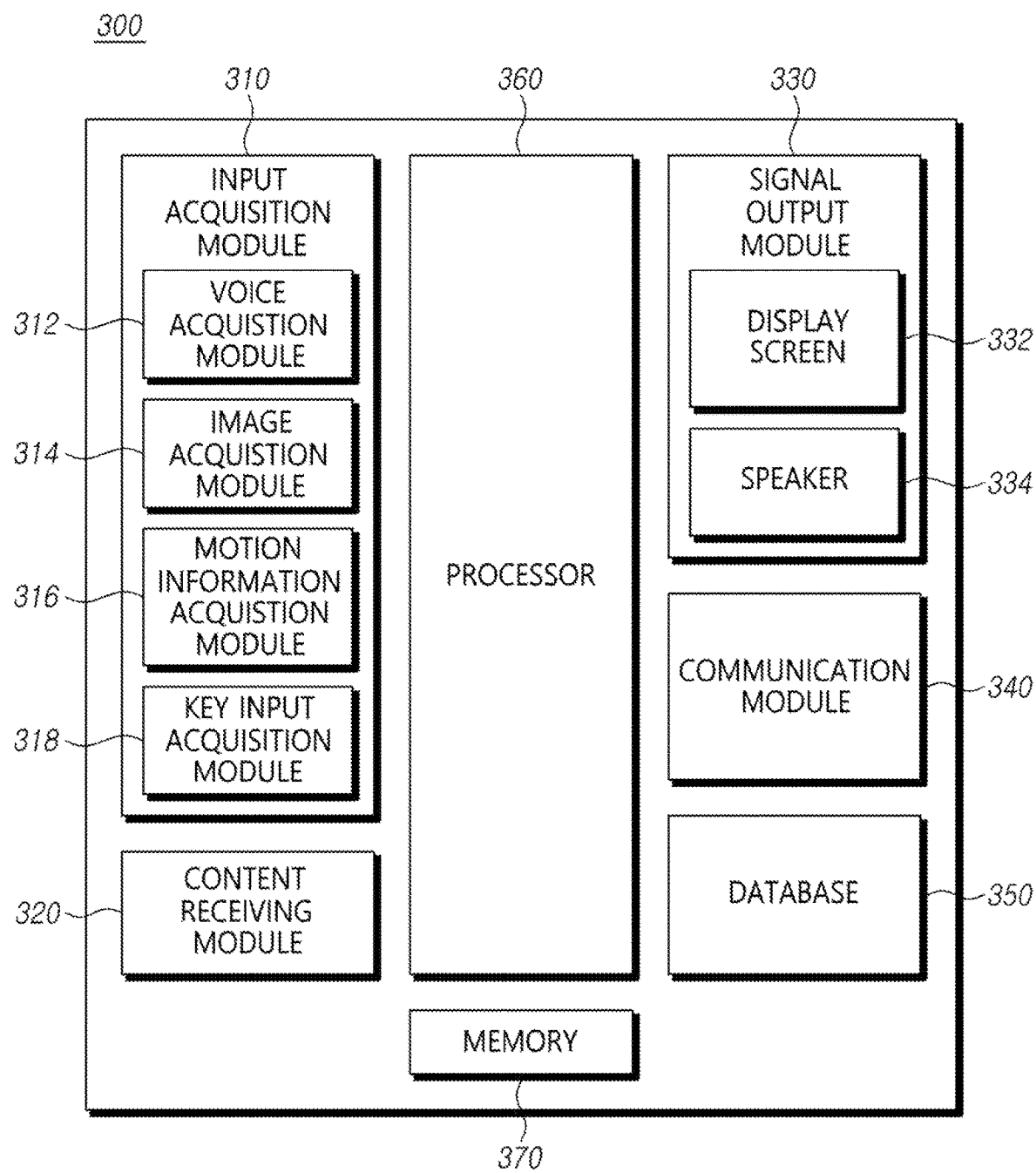
FIG. 3 is a diagram schematically illustrating a functional configuration of a display device, according to an embodiment of the present disclosure.

FIG. 3 is a diagram schematically illustrating a functional configuration of a display device 300 according to an embodiment of the present disclosure. As shown in FIG. 3, the display device 300 may include an input acquisition module 310, a content receiving module 320, a signal output module 330, a communication module 340, a database 350, a processor 360, and a memory 370.

According to an embodiment of the present disclosure, the input acquisition module 310 may receive various types of input signals from the user or the outside (e.g., other devices) and may obtain information included in the received input signals. According to an embodiment of the present disclosure, the input acquisition module 310 may include a voice acquisition module 312, an image acquisition module 314, a motion information acquisition module 316, and a key input acquisition module 318.

According to an embodiment of the present disclosure, the voice acquisition module 312 may include, for example, a microphone capable of receiving a user's utterance voice and converting the received utterance voice into an electrical signal. According to an embodiment of the present disclosure, the voice acquisition module 312 may obtain necessary information by analyzing the electrical signal obtained from the received spoken voice. According to an embodiment of the present disclosure, the voice acquisition module 312 may include a Speech-to-Text (STT) module (not shown), and the STT module may generate the corresponding text information from the voice signal obtained from the user.

According to an embodiment of the present disclosure, the image acquisition module 314 may include, for example, one or more cameras disposed in a housing of the display device 300 or connected thereto. According to an embodiment of the present disclosure, each camera of the image acquisition module 314 may detect an image signal related to a user and/or surroundings within a recognition range of the corresponding camera and obtain necessary information from the detected image signal. According to an embodiment of the present disclosure, the recognition range of each camera may be variously set depending on the angle of the corresponding camera and its surrounding environment condition. According to an embodiment of the present disclosure, when the image acquisition module 314 includes a plurality of cameras, a 3D image may be obtained using an image obtained from each camera. The present disclosure is not limited thereto. According to an embodiment of the present disclosure, the image acquisition module 314 may obtain image information including a predetermined gesture from the user through each camera.

According to an embodiment of the present disclosure, the motion information acquisition module 316 may include various sensors capable of detecting a user's motion or gesture made in the vicinity of the display device 300, for example, within a predetermined range of surrounding space. According to an embodiment of the present disclosure, the motion information acquisition module 316 may include various types of motion sensors including, for example, an ultrasonic sensor or an infrared sensor to detect a distance between the display device 300 and the user. The present disclosure is not limited thereto. According to an embodiment of the present disclosure, the user's motion or gesture detected by the motion information acquisition module 316 may include a certain movement caused by a user's body part, such as the user's face, expression, hand, fist, or finger. The present disclosure is not limited to a specific form thereof.

According to an embodiment of the present disclosure, the key input acquisition module 318 may receive, for example, a user input through an input button (not specifically shown) provided on the display device 300 or a remote input from the user through a key input on a smartphone app or an external remote controller.

According to an embodiment of the present disclosure, voice information obtained by the voice acquisition module 312, image information obtained by the image acquisition module 314, motion information obtained by the motion information acquisition module 316, and/or key input information obtained by the key input acquisition module 318 may include a turn-on or turn-off control command for the display device 300, a control command to select a source from which the display device 300 receives contents, or a volume control command to adjust the volume of the sound output from the display device 300. According to an embodiment of the present disclosure, the voice information obtained by the voice acquisition module 312, the image information obtained by the image acquisition module 314, the motion information obtained by the motion information acquisition module 316, and/or the key input information obtained by the key input acquisition module 318 may include various kinds of command information to control the display device 300, such as a command for requesting to establish a chatting channel with another user or another device, a response command to a chatting channel establishment request from another user, or a command for navigation along selection candidate entries provided on the screen of the display device 300 and selecting a specific entry. According to an embodiment of the present disclosure, the voice information obtained by the voice acquisition module 312, the image information obtained by the image acquisition module 314, the motion information obtained by the motion information acquisition module 316, and/or the key input information obtained by the key input acquisition module 318 may include a message for chatting with another user and/or another device.

According to an embodiment of the present disclosure, the content receiving module 320 may receive multimedia content data from various external content source devices according to a designated one of various wired or wireless communication methods. According to an embodiment of the present disclosure, the multimedia content data may include, for example, a video of moving picture or a still image or audio data of voice or music.

According to an embodiment of the present disclosure, the content receiving module 320 may receive each broadcast content data selectively, for example, by tuning a signal (e.g., a broadcast signal) in a specific channel (e.g., a frequency) from among radio wave signals broadcast in the air. According to an embodiment of the present disclosure, the content receiving module 320 may receive content data from a predetermined content source device, for example, a set-top box or other external contents source device, in a wired manner using various types of image transmission cables, such as component cable, composite video (e.g., color, video, blanking, and sync (CVBS)) cable, HDMI cable, USB cable, Ethernet cable or the like, or according to a short-range wireless protocol such as Wi-Fi, Bluetooth, Zigbee, Z-Wave or the like. According to an embodiment of the present disclosure, the content receiving module 320 may receive various data from an external content providing server, according to any wired/wireless communication protocol such as TCP/IP, UDP, HTTP, HTTPS, FTP, SFTP, MQTT, GSM, CDMA, WCDMA, WiMAX, LTE, LTE-A, 5G, 6G, and the like. According to an embodiment of the present disclosure, the external content providing server may include, for example, an IPTV server or an OTT server. The present disclosure is not limited to a specific form thereof.

According to an embodiment of the present disclosure, the signal output module 330 may include a display screen 332 for outputting image information and a speaker 334 for outputting sound information, although not limited thereto. According to an embodiment of the present disclosure, the display screen 332 may include a display screen of various types such as LED, OLED, Micro LED, LCD, Mini LED, Quantum-dot LED or the like. The present disclosure is not limited to a specific form. According to an embodiment of the present disclosure, the display screen 332 may display image signals of various multimedia contents received from the outside. According to an embodiment of the present disclosure, the display screen 332 may display a list of visual information indicating candidates of chatting counterparts (person and/or device/place) provided to select a chatting counterpart to establish a chatting channel with another display device. The display screen 332 may display various kinds of image information such as a video of a chatting counterpart during chatting with other display device, a list of candidate messages for selecting a message to be transmitted to the counterpart through the chatting, or a message transmitted from the user to the counterpart through the chatting, and a message received from the counterpart. According to an embodiment of the present disclosure, the speaker 334 may output voice/sound signals of various contents received from the outside, and other various voice/sound signals.

According to an embodiment of the present disclosure, the communication module 340 may support, for example, the display device 300 to communicate with the home network hubs 230 and 240 and/or other communication networks of FIG. 2, according to a predetermined wired/wireless communication protocol. According to an embodiment of the present disclosure, the communication module 340 may support, for example, the display device 300 to transmit information to the home network hubs 230 and 240 and receive information from the home network hubs 230 and 240, according to a predetermined wired/wireless communication protocol. According to an embodiment of the present disclosure, through the communication module 340, a chatting channel establishment request and/or a chatting message from the display device 300 may be transmitted to the outside, and a chatting channel establishment request for the display device 300 and/or a chatting message may be received from the outside.

According to an embodiment of the present disclosure, the database 350 may store various setting information related to the display device 300. According to an embodiment of the present disclosure, the database 350 may store predetermined information for establishing a chatting channel between the display device 300 and other display devices located inside/outside the home and proceeding with chatting. According to an embodiment of the present disclosure, the database 350 may store information about chatting counterpart candidates capable of establishing a chatting channel with the display device 300 such as an identifier (e.g., name or nickname) of each of other users in the house and image information (e.g., predetermined profile image and various information for face recognition), an identifier (name) of each of other display device (or a place where the display device is installed) in the corresponding home and its related image information, or predetermined identification information of other users and/or display devices that may be a chatting counterpart inside/outside the house or the like. According to an embodiment of the present disclosure, the database 350 may store information about a user (e.g., a main user of the display device 300) who has the corresponding display device 300 as a default device. According to an embodiment of the present disclosure, when there is a chatting counterpart registered for a direct connection with the corresponding display device 300, the database 300 may store identification information about the chatting counterpart or the display device. Description will be made to the direct connection later with reference to FIGS. 18A and 18B.

According to an embodiment of the present disclosure, the database 350 may store message candidates that the user may select as a message to be sent to the counterpart on a chatting channel between the corresponding display device 300 and other display devices inside/outside the house. According to an embodiment of the present disclosure, the message candidates that the user may select on a chatting channel may include, for example, messages preset by the user. The present disclosure is not limited thereto. According to an embodiment of the present disclosure, the message candidates stored in the database 350 that the user may select on the chatting channel may include, for example, one or more messages classified for each chatting counterpart and/or for each message (or a keyword contained in the message) received from the counterpart during the chatting.

According to an embodiment of the present disclosure, the processor 360 may analyze and determine what information the display device 300 has obtained from the outside and control the overall operation of each module of the display device 300. According to an embodiment of the present disclosure, the processor 360 may determine what the user input information obtained by the input acquisition module 310 is, for example, whether it is a chatting channel establishment request with other display device inside/outside the house or with other users, whether it is a response to the chatting channel establishment request from other user, whether it is a message to be transmitted through chatting, or whether it is related to various instructions/commands to control the display device 300. According to an embodiment of the present disclosure, the processor 360 may determine what information is received from the outside through the communication module 340.

According to an embodiment of the present disclosure, the processor 360 may control the operation of each module of the display device 300 according to respective information obtained from the input acquisition module 310 or the communication module 340. According to an embodiment of the present disclosure, the processor 360 may control, for example, whether the content receiving module 320 is to receive content data, and from which source the content is to be received. According to an embodiment of the present disclosure, the processor 360 may control to process the image and/or audio/sound information of the content data received from the external content source to be output via the display screen 332 and the speaker 334. According to an embodiment of the present disclosure, when it is determined that the user input information obtained from the input acquisition module 310 is, for example, a chatting channel establishment request with other display device or with other users inside/outside the house, a response to the chatting channel establishment request from other user, or a message to be transmitted through chatting, the processor 360 may control the operation of each module in the display device 300, to proceed with the procedures corresponding thereto, for example, to establish a chatting channel between the corresponding display device 300 and other display device inside/outside the house and/or perform chatting (message exchange) therebetween. According to an embodiment of the present disclosure, when a chatting channel establishment request and/or a message for the display device 300 is received from the outside through the communication module 340, the processor 360 may control the operation of each module in the display device 300 to proceed with the corresponding procedures.

According to an embodiment of the present disclosure, the memory 370 may store a program for the operation of the processor 360 and/or one or more instructions executable by the processor 360. According to an embodiment of the present disclosure, the memory 370 may include at least one type of storage medium of flash memory, hard disk, multimedia card micro type, card type, RAM, SRAM, ROM, EEPROM, PROM, magnetic memory, magnetic disk, optical disk or the like. According to an embodiment of the present disclosure, the processor 360 may perform various operations executable on the display device 300 by executing at least one instruction or program stored in the memory 370, for example, receiving and displaying multimedia contents, establishing a chatting channel with other display devices inside/outside the house, conducting chatting, and the like.

Figure 4:
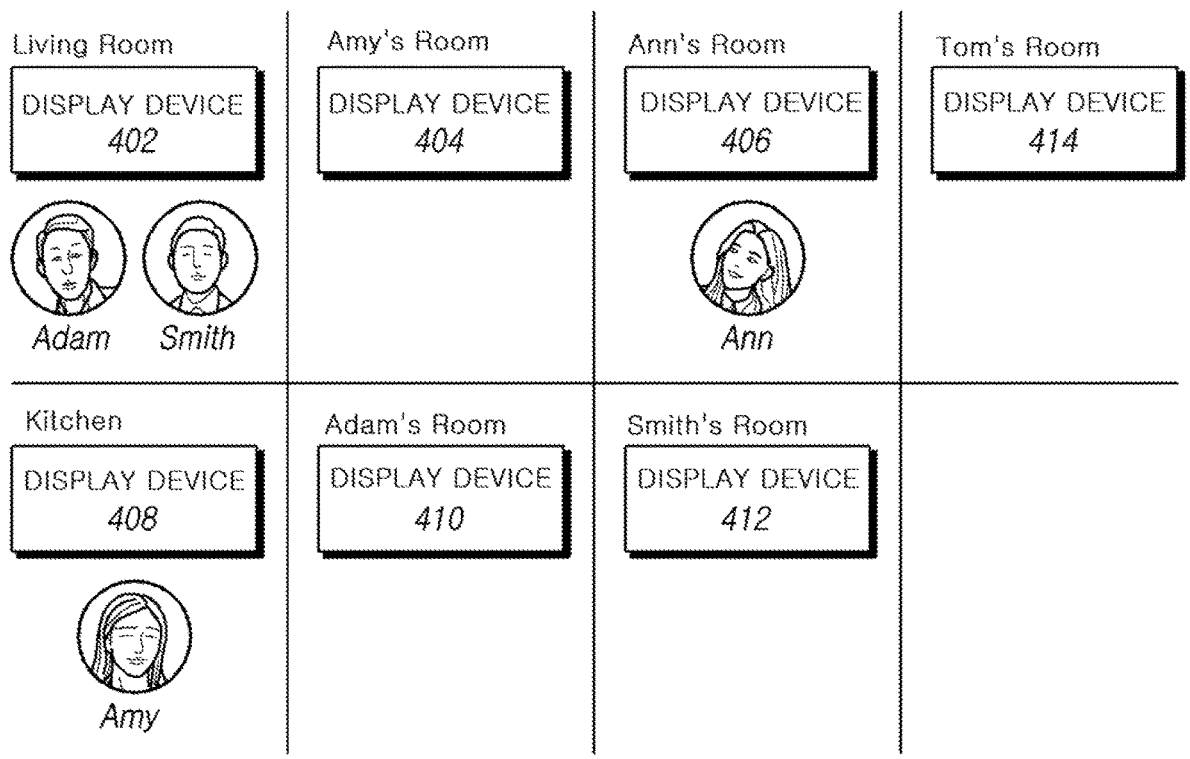
FIG. 4 is a diagram illustrating an exemplary in-house environment in which a plurality of display devices are connected to allow chatting with each other, according to an embodiment of the present disclosure.

FIG. 4 is a diagram illustrating an exemplary in-house environment in which a plurality of display devices are connected to allow chatting with each other, according to an embodiment of the present disclosure. Referring to FIG. 4, each of the display devices 402 to 414 installed at each location in the house may register and store each other as chatting candidates in advance.

Referring to FIG. 4, for example, the display device 402 may be installed in a living room and may be registered on each of display devices 402 to 414 together with a place name identifier such as "Living Room." Each of the display device 404 and the display devices 406 may be registered on each of the display devices 402 to 414 with place name identifiers of "Amy's Room" or "Ann's Room", respectively. Alternatively or additionally, the display device 408 may be registered in each of the display devices 402 to 414 together with a place name identifier such as "Kitchen". Similarly, the display device 410, the display device 412, and the display device 414 may be registered on the respective display devices 402 to 414 with place name identifiers of "Adam Room," "Smith Room," or "Tom Room", respectively. Alternatively or additionally, according to an embodiment of the present disclosure, a user Amy, a user Ann, a user Adam, a user Smith, and a user Tom may be pre-registered and stored as candidate users who can have a chat through each display device in the in-house environment. According to an embodiment of the present disclosure, the display devices 404, 406, 410, 412 and 414 respectively installed in "Amy's Room", "Ann's Room", "Adam's Room", "Smith's Room", and "Tom's Room" may be respectively determined as a default device for each of the user Amy, the user Ann, the user Adam, the user Smith, and the user Tom. As shown in FIG. 4, the user Ann with the default device 406 is currently located near the display device 406 of "Ann's room". Alternatively or additionally, in the "Living Room", the user Adam and the user Smith are located near the display device 402, and in the "Kitchen" the user Amy is located near the display device 408.

Hereinafter, with reference to FIGS. 5 to 8, description is made to a situation in which a chatting channel is established between the display devices according to some embodiments of the present disclosure.

Figure 5:
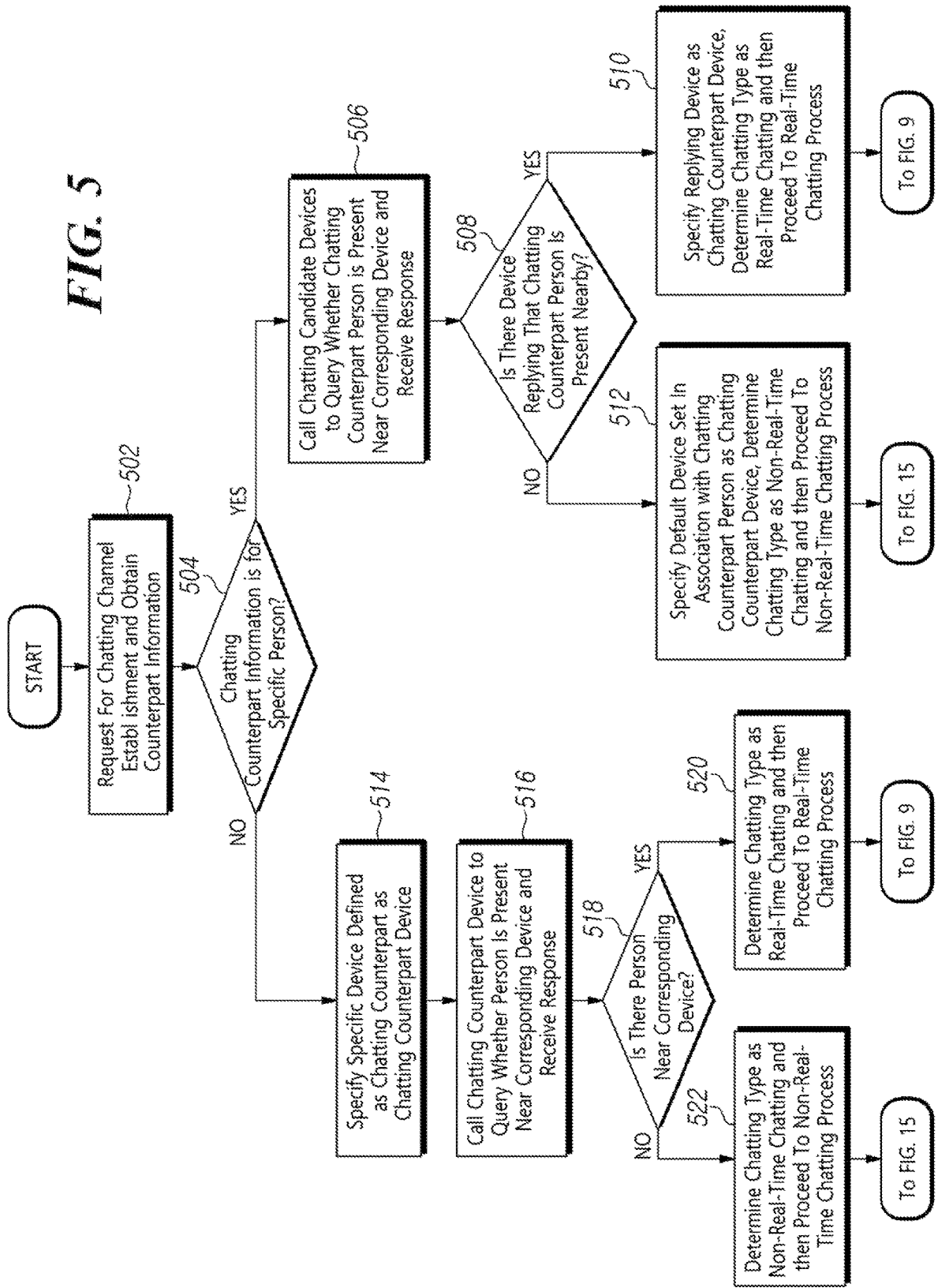
FIG. 5 is a flowchart schematically showing a sequence of procedures for establishing a chatting channel between display devices arranged in an in-house environment of FIG. 4, according to some embodiments of the present disclosure.

FIG. 5 is a flowchart schematically showing a sequence of procedures for establishing a chatting channel between the display devices 402 to 412 arranged in an in-house environment of FIG. 4, according to some embodiments of the present disclosure According to an embodiment of the present disclosure, as shown in FIG. 5, in operation 502, a display device among the display devices 402 to 414 may obtain a chatting channel establishment request and counterpart information from the user on the device. According to an embodiment of the present disclosure, the user of the display device may input the chatting channel establishment request and the counterpart information, using one of various input methods including a voice utterance, a gesture, a key input, and the like. However, the present disclosure is not limited thereto. According to an embodiment of the present disclosure, for example, the display device 406 may obtain a chatting channel establishment request setting the user Amy as a chatting counterpart, from the user Ann. According to another embodiment of the present disclosure, for example, the display device 406 may obtain a chatting channel establishment request setting the user Tom as the counterpart, from the user Ann. According to still another embodiment of the present disclosure, for example, the display device 406 may obtain a chatting channel establishment request setting the user Adam as the counterpart, from the user Ann.

In this context, various situations in each of which the user Ann of the display device 406 inputs a chatting channel establishment request and counterpart information are exemplarily shown in FIGS. 6 to 8B, according to some embodiments of the present disclosure. For example, FIGS. 6 to 8B illustrate circumstances in each of which the user Ann of the display device 406 inputs a chatting channel establishment request and counterpart information while watching a certain multimedia broadcast content through the screen of the display device 406. The present disclosure is not limited thereto. According to another embodiment of the present disclosure, a user on a display device may input a chatting channel establishment request and counterpart information, while a display screen of the display device is in an idle state (e.g., each pixel in the display screen is turned off), or is in a state of providing a fixed display information stored in the display device itself other than multimedia content input from the outside (e.g., providing fixed information such as date, weather or time, or providing a fixed image such as a picture or photograph for any decorative purpose).

Figure 6:
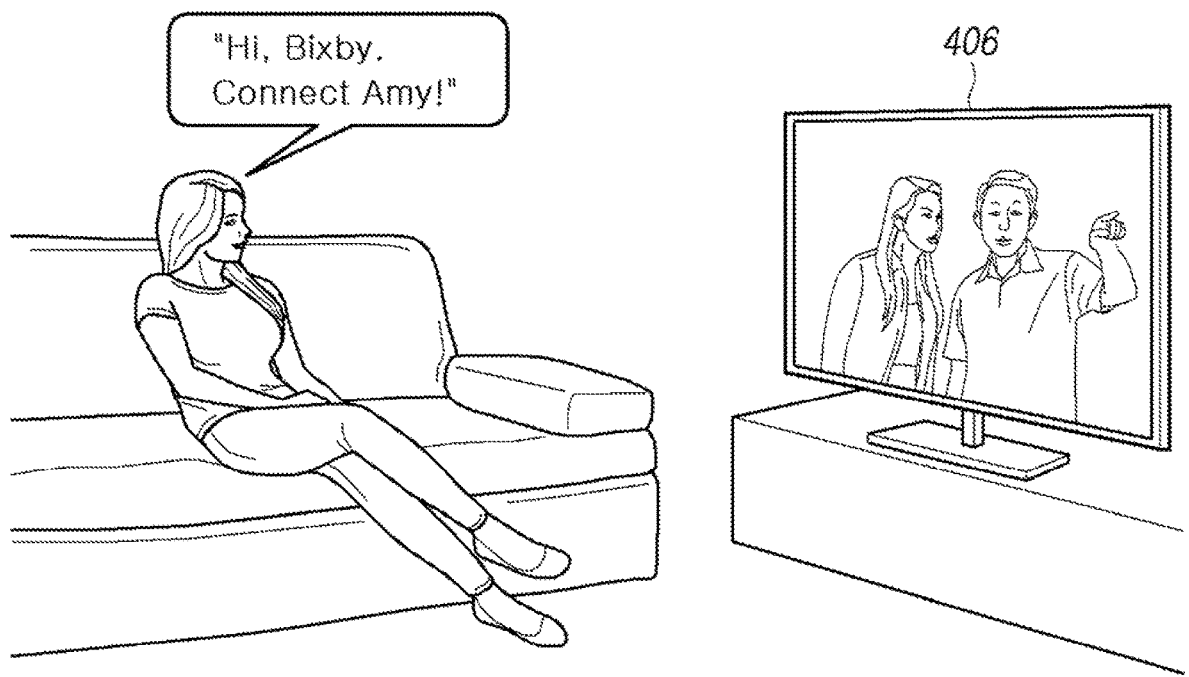
FIG. 6 is a diagram schematically illustrating an exemplary situation in which a user on a display device inputs a chatting channel establishment request and counterpart information, in a voice utterance method, according to an embodiment of the present disclosure.

Referring first to FIG. 6, the user Ann may input a chatting channel establishment request and counterpart information on the display device 406, for example, using voice utterance. According to an embodiment of the present disclosure, as shown in FIG. 6, for example, to trigger a voice input mode, the user Ann may provide a predetermined voice utterance input (e.g., a predetermined voice utterance information such as "Hi, Bixby"). However, the present disclosure is not limited thereto. According to an embodiment of the present disclosure, as shown in FIG. 6, after the voice input mode is triggered, the user Ann may provide a voice utterance input for a chatting channel establishment request and counterpart information on the display device 406 ("Connect Amy!" only as an example). According to an embodiment of the present disclosure, the display device 406 may obtain the voice utterance input from the user, for example, through the voice acquisition module on the display device.

According to an embodiment of the present disclosure, similarly to those described above in connection with the display device 300 of FIG. 3, information of the candidates who may become a chatting counterpart with the display device 406 may registered and stored in advance into the display device 406. According to various embodiments of the present disclosure, the chatting counterpart candidates may include, for example, any family members and/or friends inside/outside the house. According to an embodiment of the present disclosure, for each of the family members and/or friends inside/outside the house contained in the chatting counterpart candidates, an identifier for each person (e.g., name or nickname), a predetermined profile image and information for facial recognition for each person, and default device identification information (e.g., device address, etc.) for each person may be registered and stored in advance on the display device 406 in association with each other. According to various embodiments of the present disclosure, the chatting counterpart candidates may include, for example, devices installed in each place inside/outside the house. According to an embodiment of the present disclosure, for each of the devices included in the chatting counterpart candidates, image information for each device (e.g., device picture), and identification information for each device (e.g., device name, name of installed place and/or device address, etc.) may be stored in advance on the display device 406 in association with each other. According to an embodiment of the present disclosure, for example, predetermined users (e.g., inclusive of the user Amy, the user Adam, the user Smith, and the user Tom) and/or predetermined devices (inclusive of the display devices 402, 404, and 408 to 414, but not limited thereto) may registered and stored in advance into the display device 406 as chatting counterpart candidates together with the respective corresponding information set forth in the foregoing description. The present disclosure is not limited thereto.

Returning to FIG. 6, according to an embodiment of the present disclosure, the display device 406 may obtain a voice utterance input from the user Ann (for example, "connect Amy"), and then, by converting the obtained voice utterance input into an electrical signal and converting it again to text information, determine whether the corresponding voice utterance input is a chatting channel establishment request with other display device or another user. According to an embodiment of the present disclosure, the display device 406 may also obtain an identifier (e.g., name or nickname) of a specific person or identification information of a specific device (e.g., device name or name of installed place) from the obtained voice utterance input. According to an embodiment of the present disclosure, the display device 406 may obtain a voice utterance input from the user Ann (for example, "connect Amy"), and then obtain information on a chatting counterpart (e.g., a user Amy) desired by the user, based on comparison of the obtained information and the pre-registered and stored information in the display device 406.

Figure 7A:
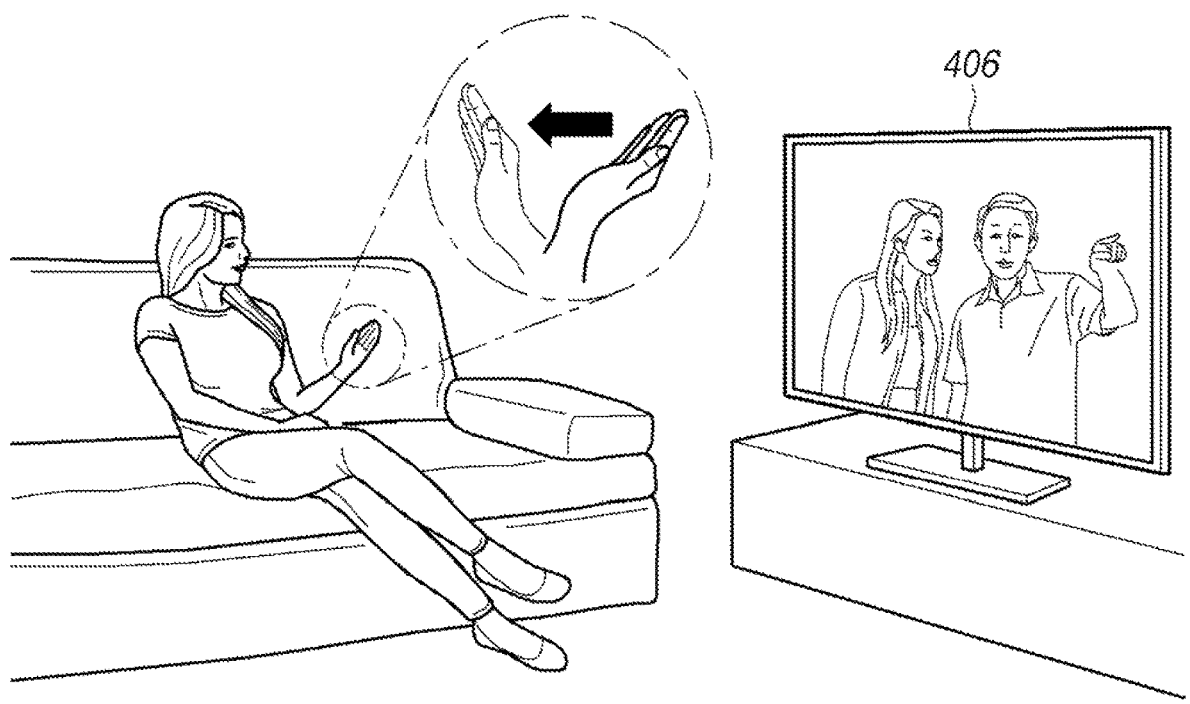
FIGS. 7A and 7B are diagrams schematically illustrating another exemplary situation in which a user on a display device inputs a chatting channel establishment request and counterpart information, in a gesture input method, according to an embodiment of the present disclosure.
Figure 7B:
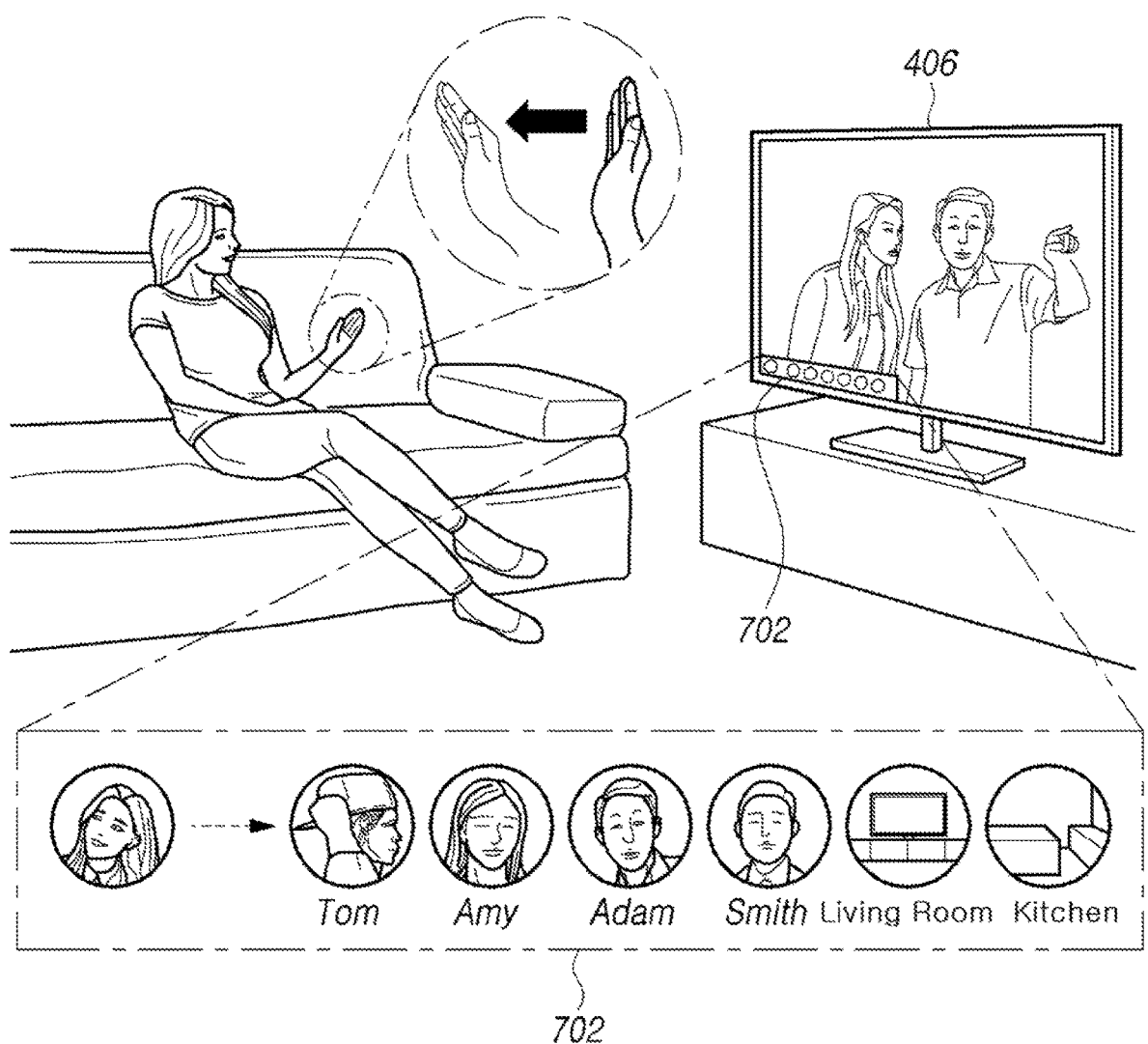

According to an embodiment of the present disclosure, as opposed to the case of FIG. 6, the user Ann may input a chatting channel establishment request and information on a chatting counterpart, for example, using a gesture input in the display device 406, as shown in FIGS. 7A and 7B. According to an embodiment of the present disclosure, for example, the gesture input by a user for a chatting channel establishment request may include predetermined gesture information (e.g., swinging his/her wrist in a predetermined direction by a predetermined angle or more). According to an embodiment of the present disclosure, the display device 406 may obtain a gesture input from the user through, for example, an image acquisition module and/or a motion information acquisition module of the corresponding device. According to an embodiment of the present disclosure, the display device 406 that has obtained a predetermined gesture input from the user Ann may analyze the obtained gesture input to determine whether the corresponding input is a chatting channel establishment request with other display device or user.

Alternatively or additionally, when a predetermined gesture is input for a chatting channel establishment request, the user may have to separately re-enter counterpart information following inputting of the chatting channel establishment request. According to an embodiment of the present disclosure, when it is determined that the gesture input obtained from the user Ann is a chatting channel establishment request, the display device 406 may provide a visual information list 702 representing chatting candidates on the screen to obtain counterpart information, as shown in FIG. 7B. Although it is illustrated in FIG. 7A that the visual information list 702 includes a profile picture (or related picture) and each identifier (e.g., name or place name) of each chatting candidate, the present disclosure is not limited thereto. According to an embodiment of the present disclosure, the visual information list indicating chatting candidates presented on the screen to obtain counterpart information may include, for example, a name/nickname or a name of installed place of each chatting candidate, or a related photo of each chatting candidate device, selectively. According to an embodiment of the present disclosure, the user may navigate to the visual information list 702 provided on the screen of the display device 406, by inputting one or more predetermined gestures, to select a specific counterpart (e.g., the user Amy) from the visual information list 702, and as described above, the image acquisition module or motion information acquisition module of the display device 406 may obtain and analyze one or more gesture inputs to obtain information on the chatting counterpart desired by the user.

Figure 8A:
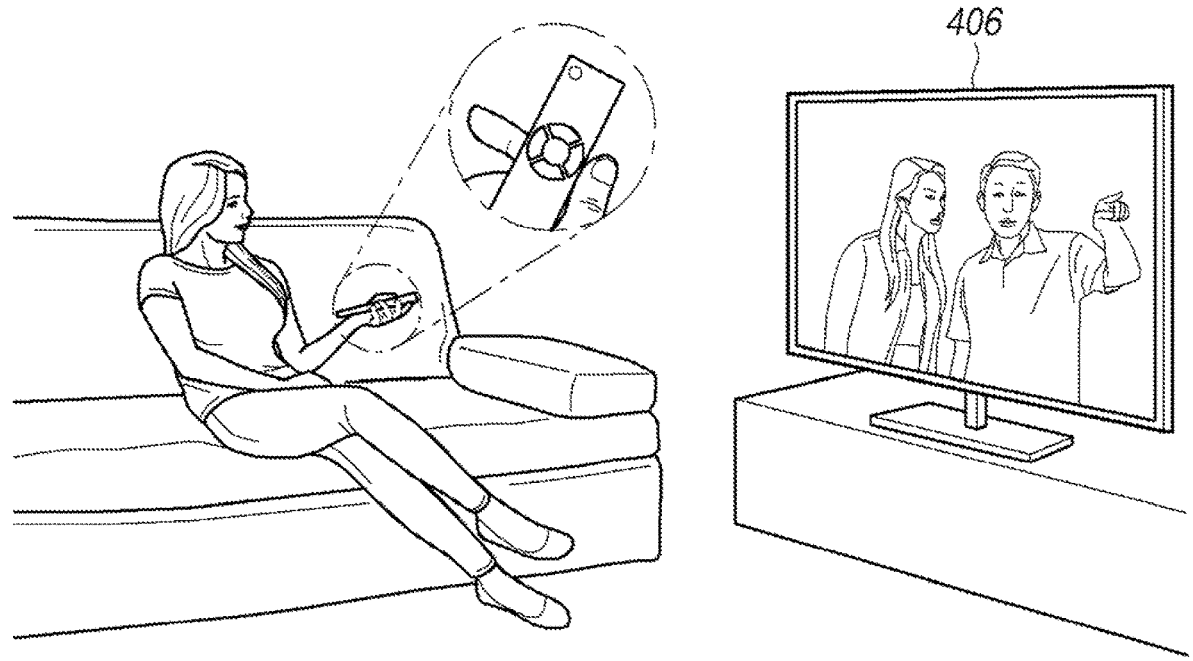
FIGS. 8A and 8B are diagrams schematically illustrating an example of still another situation in which a user on a display device inputs a chatting channel establishment request and counterpart information, in a key input method, according to an embodiment of the present disclosure.
Figure 8B:
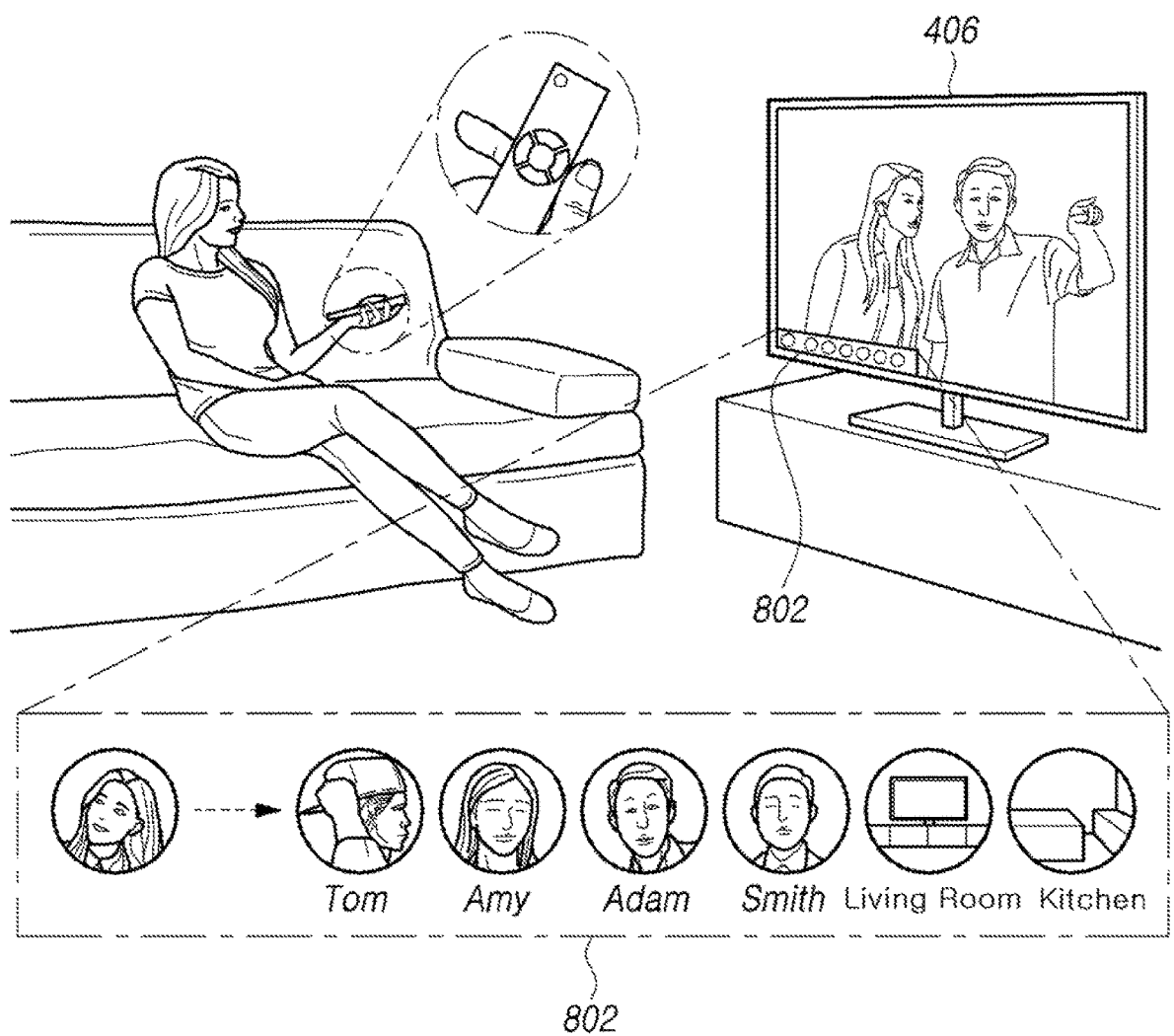

Alternatively or additionally, according to an embodiment of the present disclosure, as illustrated in FIGS. 8A and 8B, the user Ann in the display device 406 may enter a chatting channel establishment request and counterpart information, for example, by inputting a predetermined key. According to an embodiment of the present disclosure, for example, a key input from a user for triggering a chatting channel establishment request may include a predetermined key input (e.g., an input of a certain dedicated key or a combination of keys, etc.). According to an embodiment of the present disclosure, the user Ann may enter a predetermined key input, using, for example, a remote control or a smartphone app, and the display device 406 may obtain a key input from the user, for example, via a key input acquisition module on the corresponding device. According to an embodiment of the present disclosure, the display device 406 that has obtained a predetermined key input from the user Ann may analyze the obtained key input to determine that the corresponding input is a chatting channel establishment request with other display device or user.

Alternatively or additionally, as in the case of the gesture input method described above with reference to FIG. 7, when a predetermined key input is provided for a chatting channel establishment request, the user may have to re-enter the counterpart information separately after inputting the chatting channel establishment request. According to an embodiment of the present disclosure, when it is determined that the key input obtained from the user Ann is a chatting channel establishment request, the display device 406 may provide a visual information list 802 representing chatting candidates on the screen to obtain counterpart information, as shown in FIG. 8B. As in FIG. 7B, it is illustrated in this figure that the visual information list 802 includes a profile picture (or related picture) of each chatting candidate and each identifier (e.g., name or place name). The present disclosure is not limited thereto. According to another embodiment of the present disclosure, the visual information list indicating chatting candidates presented on the screen to obtain the counterpart information may include, for example, the name/nickname or name of installed place of each chatting candidate, or a related photo of each chatting candidate device, selectively. According to an embodiment of the present disclosure, the user may navigate to the visual information list 802 provided on the display screen, by inputting of one or more predetermined keys, to select a specific counterpart (e.g., the user Amy) on the corresponding list 802, and as described above, the key input acquisition module of the display device 406 may obtain and analyze one or more key inputs to obtain information on the chatting counterpart desired by the user.

Returning to FIG. 5, after obtaining the chatting channel establishment request and the counterpart information in operation 502, the display device (e.g., the display device 406) may determine, in operation 504, whether the obtained counterpart information is for a specific person or a specific device (or place). When it is determined that the counterpart information obtained in the operation 504 relates to a specific person (e.g., when a specific person's name is called by voice utterance or when an entry related to a specific person is selected from the list by a gesture or key input, etc.), the display device (e.g., the display device 406) may call, in operation 506, each of the chatting candidate devices (e.g., the display device 402, 404 or 408 to 414 of FIG. 4) registered and stored in advance as a device capable of chatting with the display device to query whether the specific person (e.g., the user Amy) is located near the respective device, and then receive a reply thereto.

According to an embodiment of the present disclosure, for example, each of the display devices 402, 404, or 408 to 414 called from the display device 406 may determine whether the specific person (e.g., the user Amy) is located near the respective device according to various schemes and then return a result of determination to the display device 406. According to an embodiment of the present disclosure, for example, each of the called display devices 402, 404 or 408 to 414 may obtain a respective surrounding image through an image acquisition module of the corresponding display device, analyze the obtained surrounding image to determine whether the corresponding specific person (e.g., the user Amy) is present in the image, and return the result of such determination to the display device 406. According to another embodiment of the present disclosure, for example, each of the display devices 402, 404 or 408 to 414 may determine whether a communication terminal (e.g., a smartphone) associated with the corresponding person (e.g., the user Amy) is present within a predetermined distance from the corresponding display devices 402, 404 or 408 to 414 according to a predetermined short-range communication scheme and then return the result of determination to the display device 406.

In operation 508, the display device (e.g., display device 406) may determine whether there is a device, from among the called chatting candidate devices (e.g., the display devices 402, 404 or 408 to 412), replying that the specific person being queried is located nearby. On that occasion (e.g., when the display device 408 replies that the user Amy is nearby), the procedure proceeds to operation 510. In the operation 510, the display device (e.g., the display device 406) may specify the corresponding replying device (e.g., the display device 408) as a chatting counterpart and determine a type of the requested chatting as real-time chatting, then proceeding to perform the real-time chatting process.

When there is no device replying that a specific person queried in the operation 508 is located near the respective device (e.g., when the counterpart information obtained in the operation 504 is a user Tom, and there is no device replying that Tom is located near the device among the called chatting candidate devices 402, 404 or 408 to 414), and the display device 406 may proceed to operation 512 to specify a default device (e.g., the display device 414) predetermined in association with the specific person (e.g., Tom) as a chatting counterpart device and determine a type of the requested chatting as non-real-time chatting, thereafter proceeding to perform the non-real-time chatting process.

When it is determined in the operation 504 that the obtained counterpart information relates to a specific device (e.g., the display device 402 in the environment of FIG. 4) (e.g., when a specific device/place name is called by voice utterance, or when an entry relating to a specific device/place is selected from the list by a gesture or key input), the display device (e.g., the display device 406) may proceed to operation 514 to specify the corresponding display device (e.g., the display device 402) as a chatting counterpart device. Then, in operation 516, the display device (e.g., the display device 406) may call the corresponding chatting counterpart device (e.g., the display device 402) to query whether a person is present near the corresponding device (here, the person may not be a specific person, but may be any person) and then receive a response thereto.

According to an embodiment of the present disclosure, for example, the called specific display device (e.g., the display device 402) may determine whether a person exists near the corresponding device, using various methods. According to an embodiment of the present disclosure, the specific display device may obtain a surrounding image through the image acquisition module of the display device, analyze the obtained surrounding image to determine whether a person is present in the image, and then return a result of such determination to the display device (e.g., the display device 406). According to another embodiment of the present disclosure, for example, the specific display device (e.g., the display device 402) may determine whether a person is present in the vicinity of the respective device, based on the motion obtained by the motion acquisition module in the device or other various methods, and then return a result of such determination to the display device 406.

In operation 518, the display device (e.g., the display device 406) may determine whether the response from the called device (e.g., display device 402) indicates that a person is present in the vicinity of the device, and in such a case, the process may proceed to operation 520 to determine a type of the requested chatting as real-time chatting, and then proceed with the real-time chatting process. For example, in the environment shown in FIG. 4, when the display device 406 obtained a chatting channel establishment request to set the display device 402 installed in the living room as a chatting counterpart, and has received from the display device 402 installed in the living room a response that a person (e.g., the user Adam and the user Smith) exists nearby, the display device may proceed with a real-time chatting process with the display device 402. If, in operation 518, it is determined that the response from the called device indicates that no person is present in the vicinity of the corresponding device, then the display device 406 proceeds to operation 522 to determine a type of the requested chatting as non-real-time chatting and perform the non-real-time chatting process.

Figure 9:
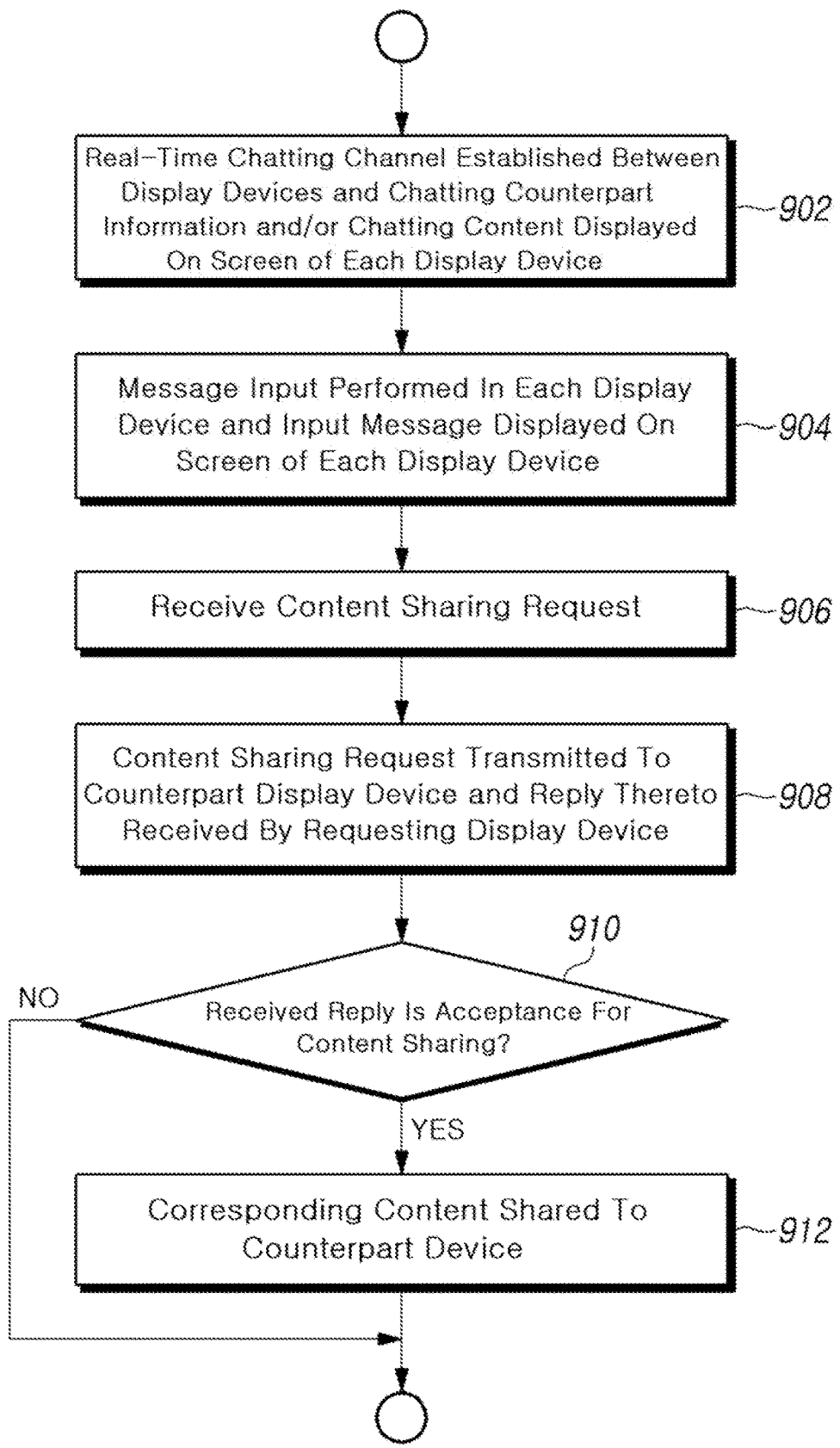
FIG. 9 is a flowchart showing a sequence of procedures through which based on a request at a display device, real-time chatting between the display device and a counterpart display device is made in the in-house environment of FIG. 4, according to an embodiment of the present disclosure.

FIG. 9 is a flowchart showing a sequence of procedures in which based on a request at a display device (e.g., the display device 406), real-time chatting between the display device and a counterpart display device (e.g., the display device 408) is made in the in-house environment of FIG. 4, according to an embodiment of the present disclosure. According to an embodiment of the present disclosure, for example, for the display device 406, the user Ann may be registered and stored in advance as a user who uses the respective device as a default device. The present disclosure is not limited thereto. According to an embodiment of the present disclosure, for example, the counterpart information related to a chatting channel establishment request obtained from the display device 406 may relate to a specific person, that is, the user Amy, and the display device 408 may be specified as a chatting counterpart device for chatting with the user Amy, according to the procedure described above with reference to FIG. 5.

According to an embodiment of the present disclosure, in operation 902, a real-time chatting channel may be established between the display device (e.g., the display device 406) that has requested establishment of a chatting channel and other display device (e.g., the display device 408) specified as a chatting counterpart device. Information on both chatting counterparts and/or chatting messages may be visually displayed on each screen of both the display devices (e.g., the display devices 406 and 408). According to an embodiment of the present disclosure, chatting counterpart information visually displayed on each screen of both the display devices may include visual information indicating a person involved in the corresponding chatting (e.g., a name or nickname or a profile picture of each related person) or visual information indicating a corresponding device (place) (e.g., a photo related to the corresponding device or a name of installed place). The present disclosure is not limited thereto. According to an embodiment of the present disclosure, the chatting message visually displayed on each screen of both the display devices may include respective message information input by the user at each stage. According to an embodiment of the present disclosure, a specific position and method in which each chatting counterpart information and/or chatting messages are visually displayed on the screen of each of the display devices (e.g., the display devices 406 and 408) may vary depending on whether multimedia content is being currently displayed on the corresponding screen.

Figure 10A:
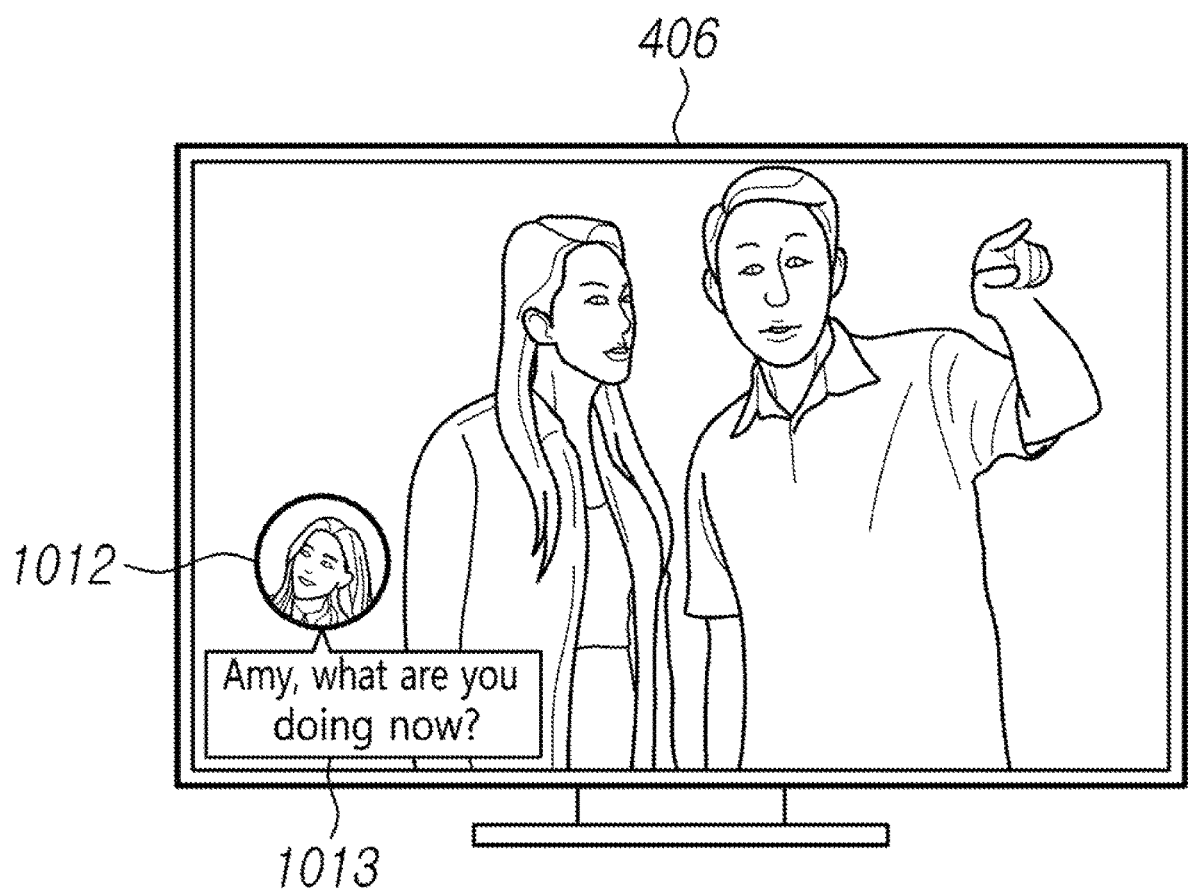
FIGS. 10A and 10B illustrate an exemplary situation in which when a real-time chatting channel is established between a requesting display device and a counterpart display device while a multimedia content is being displayed on a screen of the requesting display device, information of each display device and each chatting message are visually displayed on the screen of the requesting display device, according to an embodiment of the present disclosure.
Figure 10B:
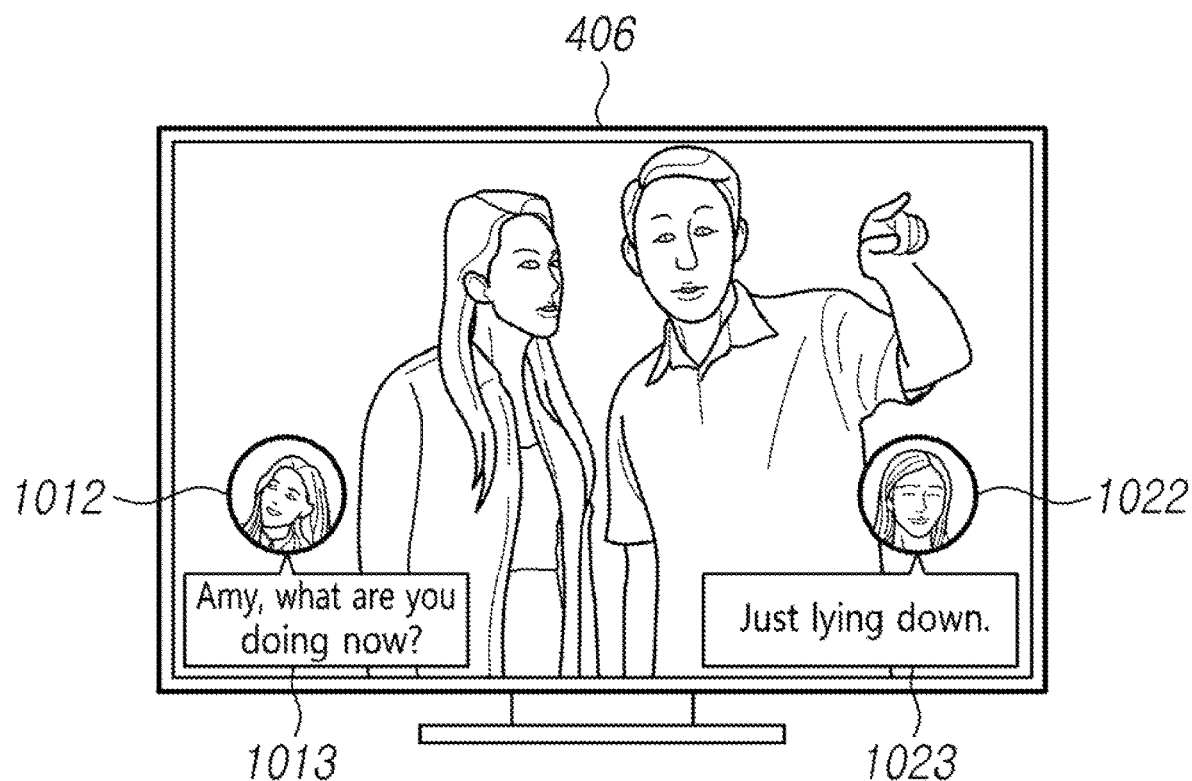

FIGS. 10A and 10B illustrate an exemplary situation in which when a real-time chatting channel is established between a requesting display device and a counterpart display device while a multimedia content is being displayed on a screen of the requesting display device, information of each display device and respective chatting messages are visually displayed on the screen of the requesting display device 406, according to an embodiment of the present disclosure. According to an embodiment of the present disclosure, while the real-time chatting channel is established (e.g., until a response for establishing a chatting channel is received from the counterpart device 408 after obtaining a chatting channel establishment request on the display device 406), as shown in FIG. 10A, the information (e.g., the user Ann's profile picture) on a chatting counterpart on the corresponding display device 406 (e.g., the user Ann registered in advance as the user using the display device 406 as a default device) may be displayed on one side (e.g., in the lower left corner) of the screen of the display device 406. Alternatively or additionally, as shown in FIG. 10A, a chatting message 1013 obtained from the user of the display device 406 may be displayed together on one side (e.g., in the lower left corner) of the screen of the display device 406. Although in this drawing the chatting counterpart information displayed on the screen of the display device 406 is illustrated as a profile picture of a specific user, that is, the user Ann, the present disclosure is not limited thereto. According to another embodiment of the present disclosure, the chatting counterpart information displayed on the display device 406 may include other identification information such as a name or nickname of a specific user, for example, the user Ann, or visual information indicating the corresponding display device 406, for example, a picture of the display device 406 or its installed place or a name of installed place (e.g., "Ann's Room"). The present disclosure is not limited to a specific occasion.

According to an embodiment of the present disclosure, after a real-time chatting channel is established between the display device 406 and the display device 408 (e.g., after there is a response for establishing a chatting channel from the counterpart device 408), for example, as shown in FIG. 10B, along with the chatting counterpart information (e.g., the user Ann's profile picture 1012) and the chatting message 1013 on the display device 406 displayed on one side (e.g., in the lower left corner) of the screen of the display device 406, the chatting message 1013, the chatting counterpart information (e.g., the user Amy's profile picture) 1022 on the counterpart display device 408 and the chatting message 1023 obtained on the counterpart display device 408 may be displayed on the other side of the screen (e.g., in the lower right corner). Although in this drawing the chatting counterpart information displayed on the display device 406 is illustrated as a profile picture of the user Amy, the present disclosure is not limited thereto. According to another embodiment of the present disclosure, the chatting counterpart information displayed on the display device 406 may be other identification information indicating the chatting counterpart user, for example, a name or nickname of the user Amy. According to yet another embodiment of the present disclosure, for example, when in the display device 406 the counterpart information obtained in relation to the corresponding chatting channel establishment request relates to a specific device (or place) itself (e.g., when the obtained counterpart information specifies the display device 408), the chatting counterpart information displayed on the display device 406 may include visual information indicating the display device 408, for example, a picture of the display device 408 or a corresponding installed place or a name of installed place (e.g., "kitchen"). The present disclosure is not limited to a specific case thereof.

According to an embodiment of the present disclosure, as shown in FIGS. 10A and 10B, when various information about the real-time chatting is displayed while providing a multimedia content on the screen of the display device 406, such information may be displayed as small as possible outside the content being played on the screen or in part of its edge, so as not to interfere with the user's viewing experience of the multimedia content through the screen.

Figure 11A:
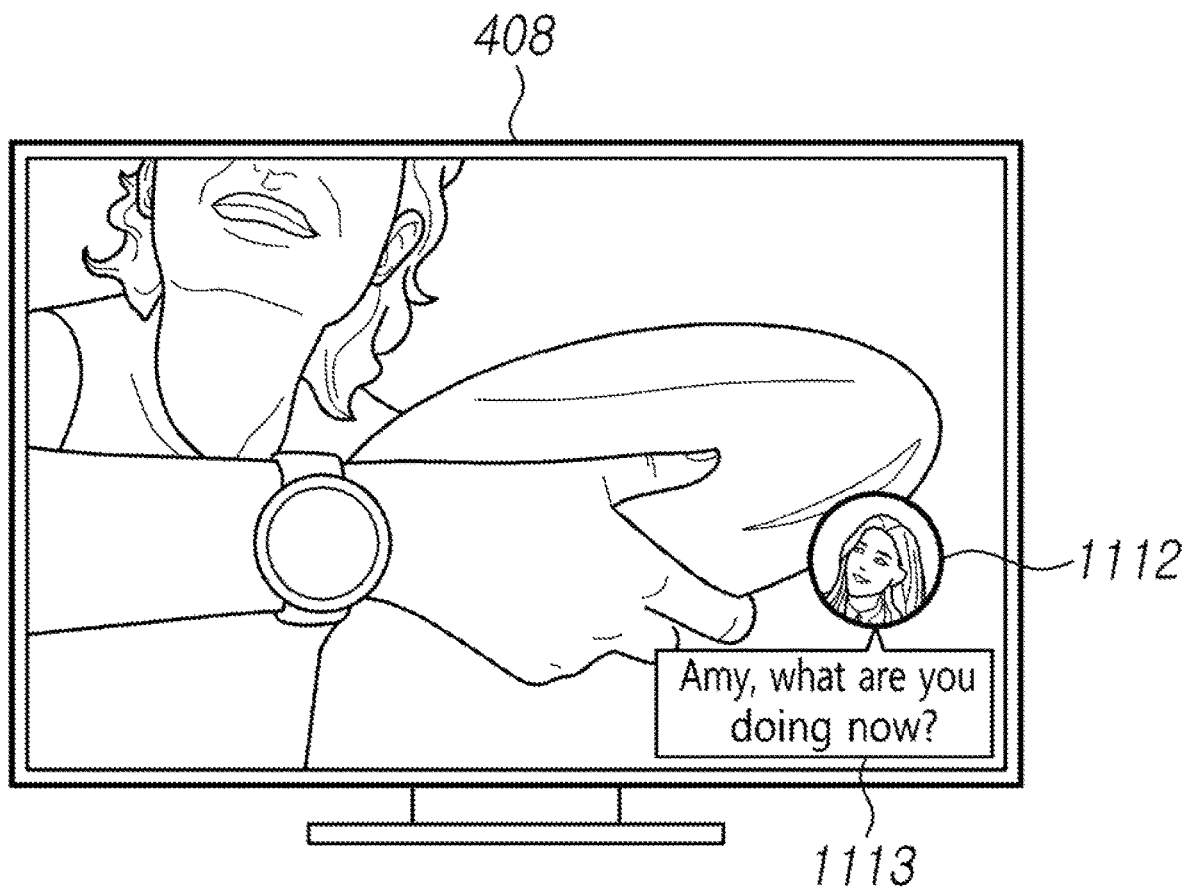
FIGS. 11A and 11B illustrate an exemplary situation in which when the real-time chatting channel is established between the requesting display device and the counterpart display device while a multimedia content is being displayed on the screen of the counterpart display device, information of each display device and each chatting message are visually displayed on the screen of the counterpart display device, according to an embodiment of the present disclosure.

Referring to FIG. 11, it is illustrated an example of a situation in which information of both counterparts of real-time chatting and each chatting message are visually displayed on the screen of the display device 408 that has received a chatting request, when a real-time chatting channel has been established between the display devices of both counterparts according to a request from the display device 406 while providing a multimedia content on the screen of the display device 408, according to an embodiment of the present disclosure. According to an embodiment of the present disclosure, while a real-time chatting channel is being established, as shown in FIG. 11A, the chatting counterpart information 1112 on the display device 406 requesting establishment of a chatting channel, for example, a profile picture of the user Ann and a chatting message 1113 received from the display device 406 may be displayed on one side (e.g., in the lower right corner) of the screen of the display device 408. Although in this drawing the chatting counterpart information 1112 on the display device 406 displayed on the screen of the display device 408 is illustrated to be the same as the information 1012 displayed with respect to the corresponding display device 406, on the lower left corner of the screen of the display device 406 requesting establishment of the chatting channel shown in FIG. 10. The present disclosure is not limited thereto. According to another embodiment of the present disclosure, the profile picture of the user Ann may be displayed as information displayed with respect to the display device 406 on the screen of the display device 406 requesting the chatting, whereas on the screen of the display device 408 that was requested for the chatting, the name or nickname of the user Ann or the profile picture of the place where the display device 406 is installed or the name of the installed place (e.g., "Kitchen") may be displayed as the chatting counterpart information regarding the display device 406 requesting the chatting. The present disclosure is not limited to a specific case thereof.

Figure 11B:
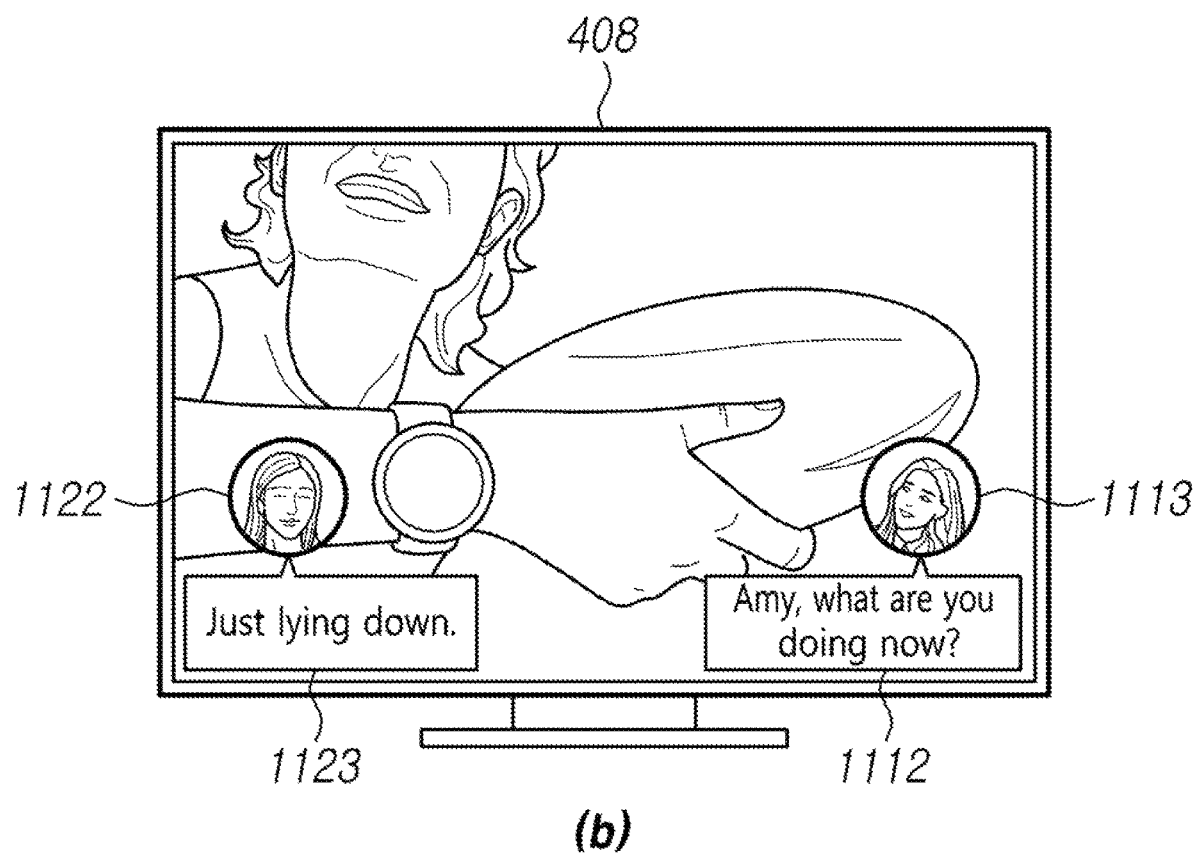

Then, according to an embodiment of the present disclosure, after a real-time chatting channel is established (e.g., from when a user response is obtained on the display device 408), as shown in FIG. 11B, along with the chatting counterpart information (e.g., the user Ann's profile picture) 1112 and the chatting message 1113 on the display device 406 displayed on one side (e.g., in the lower right corner) of the screen of the display device 408, the chatting counterpart information (e.g., the user Amy's profile picture) 1122 on the corresponding display device 408 and the chatting message 1123 obtained on the display device 408 may be displayed on the other side (e.g., in the lower left corner) of the screen. Although it is illustrated in this drawing that the chatting counterpart information 1122 about the corresponding display device 408 displayed on the screen of the display device 408 is the same as the information 1022 displayed with respect to the display device 408 at the lower right corner of the screen of the display device 406 shown in FIG. 10, the present disclosure is not limited thereto. According to another embodiment of the present disclosure, the profile picture of the user Amy is displayed on the screen of the display device 406 requesting the chatting, whereas on the screen of the display device 408 requested for the chatting, the user Amy's name or nickname or a profile picture or a name (e.g., "Amy's room") of a place where the display device 408 is installed may be displayed as the chatting counterpart information on the corresponding display device 408. The present disclosure is not limited to a specific case thereof.

According to an embodiment of the present disclosure, in FIGS. 10 and 11, it is illustrated that when a real-time chatting channel is established between both the display devices while a multimedia content is being provided on each screen of the display device 406 and the display device 408, the information related to the real-time chatting is displayed in the lower left and right corners on each screen of the display device 406 and the display device 408, so as not to interfere with the user's viewing experience of each multimedia content, but the present disclosure is limited thereto. According to another embodiment of the present disclosure, such information related to the real-time chatting may be displayed on a different partial area of each screen of the display devices 406 and 408 so as not to interrupt the user's viewing experience of each multimedia content.

Figure 12A:
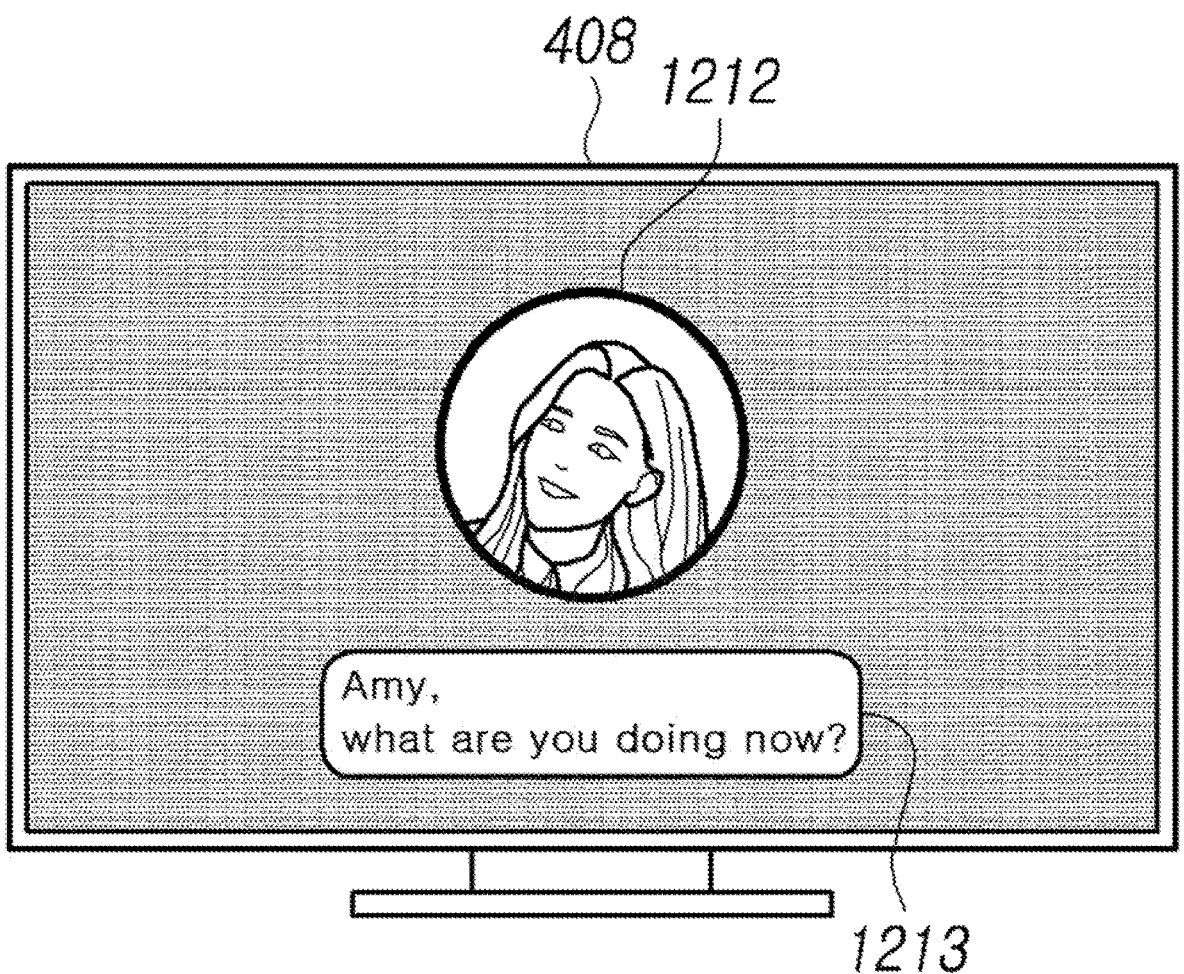
FIGS. 12A and 12B illustrate an exemplary situation in which when a real-time chatting channel is established between a requesting display device and a counterpart display device while no multimedia content is displayed on a screen of the counterpart display device, information of each display device and each chatting message are visually displayed on the screen of the counterpart display device, according to an embodiment of the present disclosure.
Figure 12B:
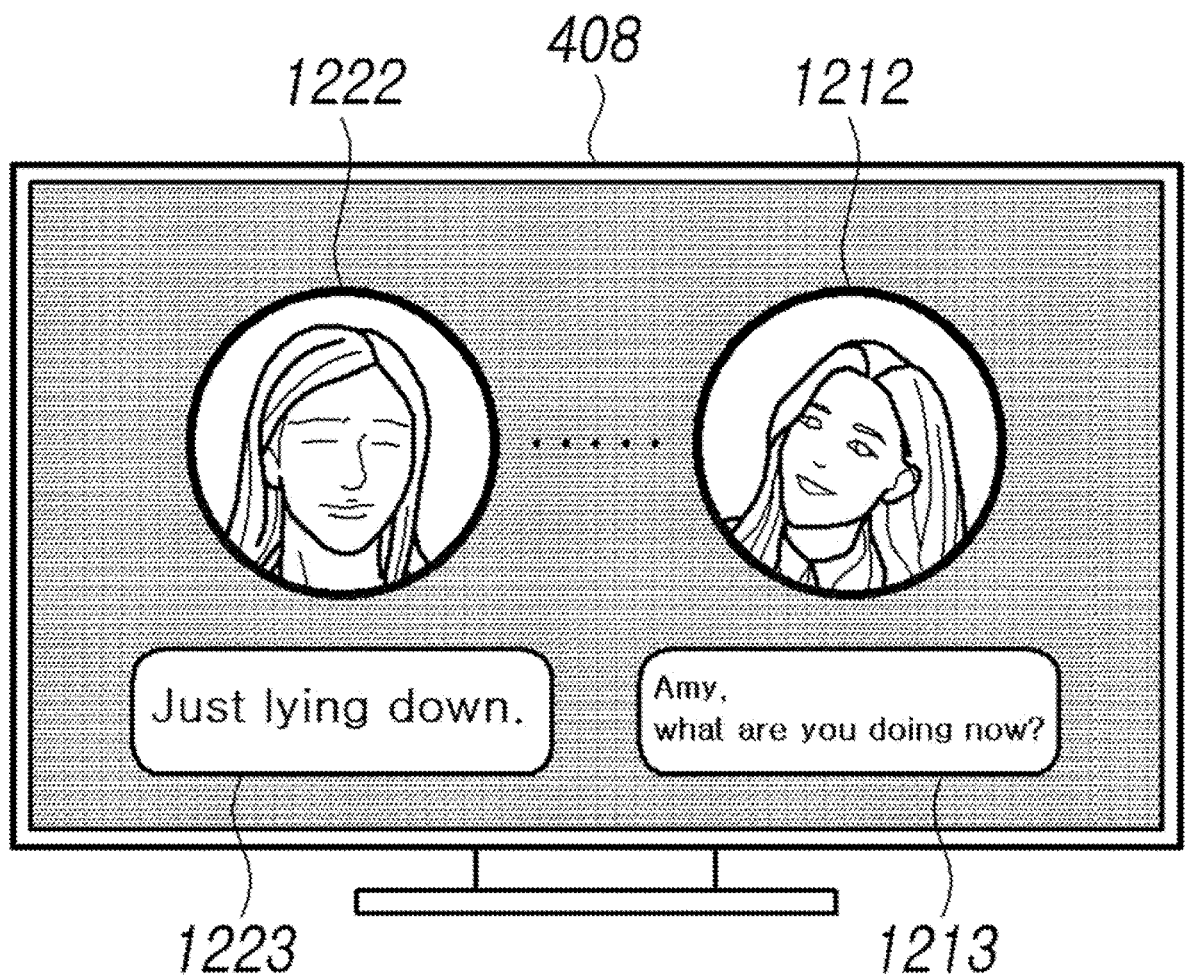

According to an embodiment of the present disclosure, as opposed to those shown in FIG. 11, it is illustrated in FIG. 12 an example of a situation in which information of both counterparties of real-time chatting and each chatting message are visually displayed on the screen of the display device 408, when a real-time chatting channel is established between the display device 406 and the display device 408 according to the request from the display device 406, while no multimedia content is provided on the screen of the display device 408. According to an embodiment of the present disclosure, while a real-time chatting channel is being established, as shown in FIG. 12A, the information of both the chatting counterparts of the display device 406, for example, a profile picture 1212 of the user Ann and a chatting message 1213 received from the display device 406 may be displayed on a center portion of the screen of the display device 408. According to an embodiment of the present disclosure, after a real-time chatting channel is then established, as shown in FIG. 12B, the chatting counterpart information (e.g., the user Ann's profile picture) 1212 and the chatting message 1213 originally displayed on the center portion of the display device 408 may be displayed moving slightly to the right from the center of the screen, and at the same time, the chatting counterpart information (e.g., the user Amy's profile picture) 1222 and the chatting message 1223 may be displayed on the left side of the display device 408. According to an embodiment of the present disclosure, as shown in FIGS. 12A and 12B, when information on real-time chatting is displayed while no multimedia content is provided on the screen, it may be displayed in a relatively larger size in the center portion of the screen to further improve the user's chatting concentration. In the present disclosure, a case of no multimedia content being provided on a screen of a display device may include, for example, a circumstance when the display screen of the corresponding display device is in an idle state (e.g., each pixel of the display screen being turned off) as well as a state of providing a predetermined fixed display stored in the display device other than the multimedia contents for viewing input from the outside (e.g., providing fixed information such as date, weather, time, or providing a fixed image such as picture or photograph for decorative purposes).

Returning to FIG. 9, in operation 904, on each display device, a message input from the respective user may be made for real-time chatting, and the input message may be sequentially displayed on the screen of each display device participating in the chatting. According to an embodiment of the present disclosure, a message input made in each display device may be performed in various ways, for example, by voice utterance, a gesture, or a key input, as in the case of the above-described chatting channel establishment request.

Figure 13A:
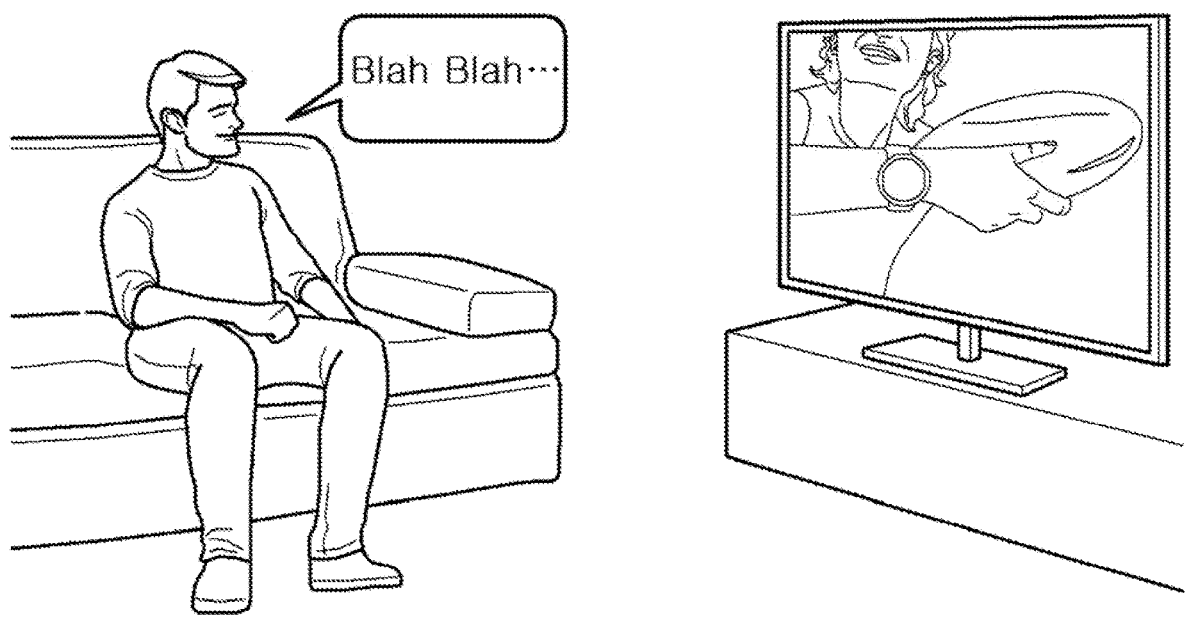
FIGS. 13A, 13B and 13C are diagrams schematically illustrating various ways in which a user inputs a chatting message with a display device, according to some embodiments of the present disclosure.
Figure 13B:
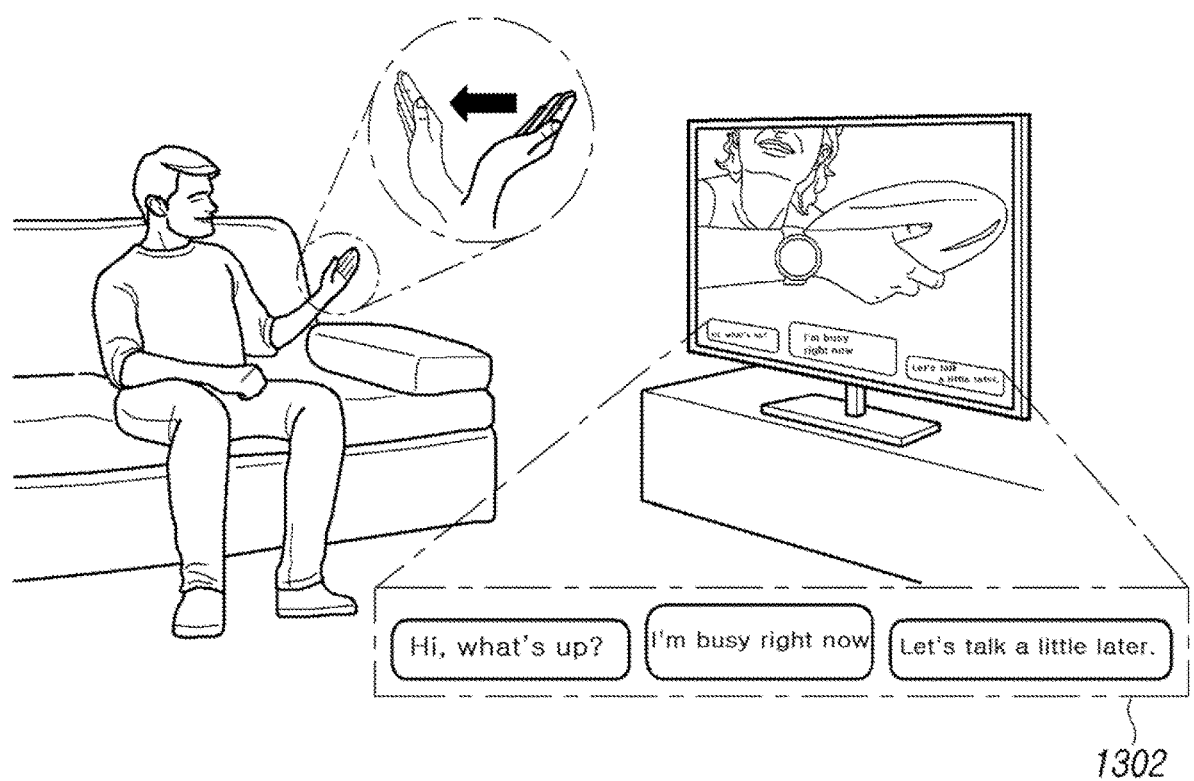
Figure 13C:
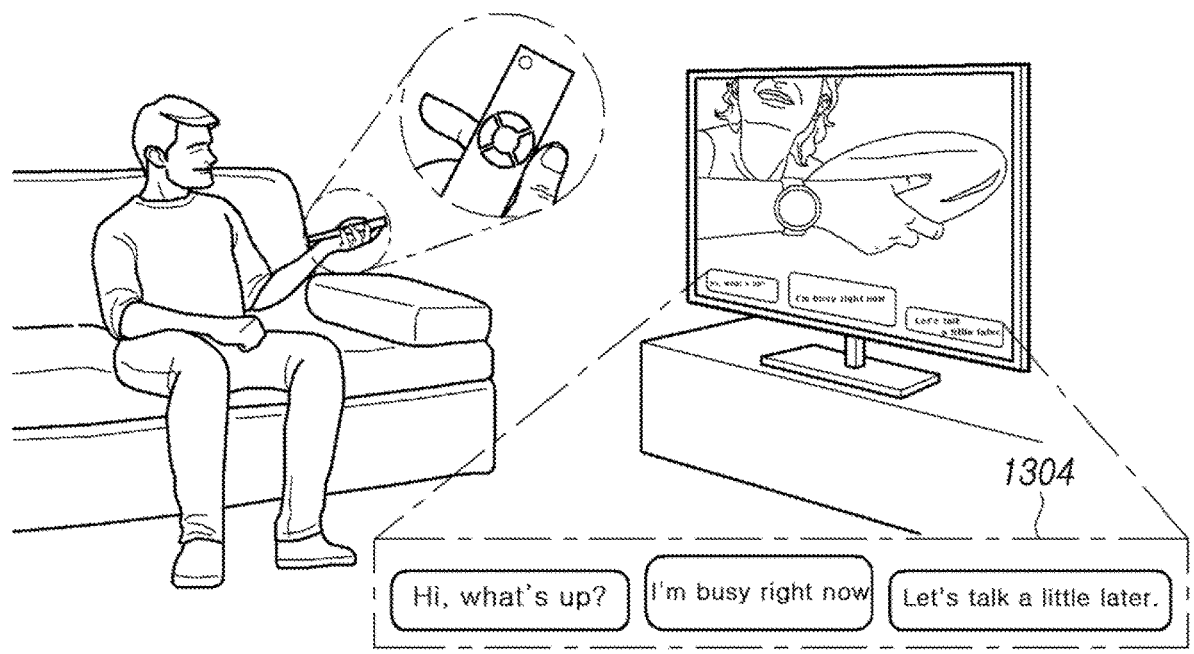

FIGS. 13A, 13B and 13C are diagrams schematically illustrating an example of various ways in which a user inputs a chatting message with a display device, according to some embodiments of the present disclosure.

For example, in FIG. 13A, it is illustrated an example of an occasion in which a message input is performed using a voice utterance method. Although not specifically illustrated herein, the user may input a predetermined voice utterance (e.g., a voice utterance information such as "Hi Bixby") for entering a voice input mode. The present disclosure is not limited thereto. Here, if the system has been already entered into the voice input mode, a voice uttering step for triggering the voice input mode may be omitted. According to an embodiment of the present disclosure, after the voice input mode is triggered, the user may input a voice utterance including a message to be transmitted. According to an embodiment of the present disclosure, the display device may obtain the voice utterance input from the user via the voice acquisition module. According to an embodiment of the present disclosure, the display device may convert the obtained voice utterance input into an electrical signal and convert it again into text information to transmit the corresponding text information to the counterpart display device. On this occasion, the corresponding display device and the counterpart display device may display the above-described text information, that is, a chatting message, on the screen, respectively.

In FIG. 13B, it is illustrated an example of an occasion in which a message input is performed using a gesture input method. According to an embodiment of the present disclosure, the user may make a predetermined gesture to trigger entry into the message input mode. According to an embodiment of the present disclosure, the display device may obtain a gesture input from the user via the image acquisition module and/or motion information acquisition module of the display device and then analyze the obtained input to determine whether the gesture input is a gesture for triggering entry into the message input mode. According to an embodiment of the present disclosure, when the display device determines that the gesture input from the user is for entering the message input mode, as shown in FIG. 13B, the display device may display a message list 1302 indicating message candidate entries that the user may select, on the screen of the corresponding display device. According to an embodiment of the present disclosure, the message candidate entries may include, for example, a message frequently used by the user inputting a corresponding message, a message frequently used by a counterpart user to receive the corresponding message, and/or a message frequently used in response to the message that the corresponding user received from the counterpart user in the previous step, and all those message may include messages prepared in advance in consideration of various criteria. According to an embodiment of the present disclosure, the user may select a specific message from the list 1302 by navigating to the list 1302 displayed on the screen, using inputting one or more predetermined gestures, and the selected message may be transmitted to the counterpart display device. In this context, the corresponding display device and the counterpart display device may display the selected chatting message on the screen, respectively.

In FIG. 13C, it is illustrated an example of a circumstance in which a message input is performed using a key input method. According to an embodiment of the present disclosure, the user may perform a predetermined key input to trigger entry into the message input mode. According to an embodiment of the present disclosure, the display device may obtain a predetermined key input from the user via the key input acquisition module of the display device and then analyze the obtained input to determine whether the corresponding key input is a key input for triggering entry into the message input mode. According to an embodiment of the present disclosure, when it is determined that the key input from the user is for entering the message input mode, as shown in FIG. 13C, the display device may display on the screen of the display device a message list 1304 indicating message candidate entries that the user may select. According to an embodiment of the present disclosure, when the message input mode is entered by the key input as described above, the message list 1304 displayed on the screen of the display device may be the same as the message list 1302 displayed on the screen of the corresponding display device when entering the message input mode by the gesture input in FIG. 13B. The present disclosure is not limited thereto. According to an embodiment of the present disclosure, the user may select a specific message from the list 1304 by navigating the list 1304 provided on the screen, by inputting of one or more predetermined keys, and the selected message may be transmitted to the display device. In this context, the corresponding display device and the counterpart display device may respectively display the selected chatting message on each screen.

According to an embodiment of the present disclosure, the message input method in each display device conducting chatting, for example, each of the display device 406 and the display device 408 may be set in various manners, for example, by the user's selection for each input. For example, after the user on the display device 406 makes a chatting channel establishment request or inputs a message by means of a voice utterance, the user may input, in a next turn, a message by means of either a gesture input method or a key input method or enter a message with a different input method. The present disclosure is not limited to a specific order thereof.

Returning to FIG. 9, in operation 906, while a content being displayed on a screen of either one of both the display devices (e.g., the display device 408) during the real-time chatting, a content sharing request to share the content with a counterpart display device (e.g., the display device 406). According to an embodiment of the present disclosure, the content sharing request may be made by one of various methods including the above-mentioned voice utterance, gesture, or key input. In operation 908, the content sharing request input in the operation 906 may be transmitted to the counterpart display device (e.g., the display device 406), and a response thereto may be received to the requesting display device (e.g., the display device 408). According to an embodiment of the present disclosure, for example, a question as to whether to accept the content sharing request may be displayed on the screen of the display device (e.g., the display device 406) that has received the content sharing request from its counterpart. After a response to such a query is obtained from the user on the respective display device (e.g., the display device 406), the obtained response may be transmitted to the display device that sent the content sharing request (e.g., display device 408).

In operation 910, it may be determined whether the response received from the counterpart display device (e.g., the display device 406) is an acceptance for the content sharing, in which case the procedure proceeds to operation 912 to share the corresponding content information with the counterpart's display device (e.g., the display device 406). According to an embodiment of the present disclosure, for example, the information provided to a counterpart display device for the content sharing may be different depending on the type of contents. For example, according to an embodiment of the present disclosure, when the content to be shared is a terrestrial broadcast content or an OTT content, content acquisition information regarding the corresponding content may be provided to the counterpart's display device. According to an embodiment of the present disclosure, when the content to be shared is a unique external input (e.g., an input obtained through HDMI wired connection, etc.) obtained in the corresponding display device, the display information being reproduced on the corresponding display device may be transmitted in real-time streaming to the counterpart display device.

FIGS. 14A and a4B illustrate an example of a screen of a display device that received a content shared from a counterpart display device during real-time chatting therebetween, according to an embodiment of the present disclosure. As illustrated in FIG. 14A, the contents being displayed on each screen of the display device 406 and the display device 408 of the chatting counterparts before the content sharing are different from each other. In this figure, the profile pictures of both parties are displayed small in both corners of the screens of the display devices so as not to interfere with the user's viewing experience of the content, but for convenience of explanation, the display of chatting messages exchanged between both parties at each stage is omitted. The present disclosure is not limited to a specific form thereof. According to an embodiment of the present disclosure, for example, when there is a content sharing request from the display device 408 and the display device 406 accepts it, as shown in FIG. 14B, the same content as the content being displayed on the screen of the display device 408 may be shared and displayed on the screen of the display device 406. In this context, both parties may have a chat with each other while watching the shared content together.

Figure 15:
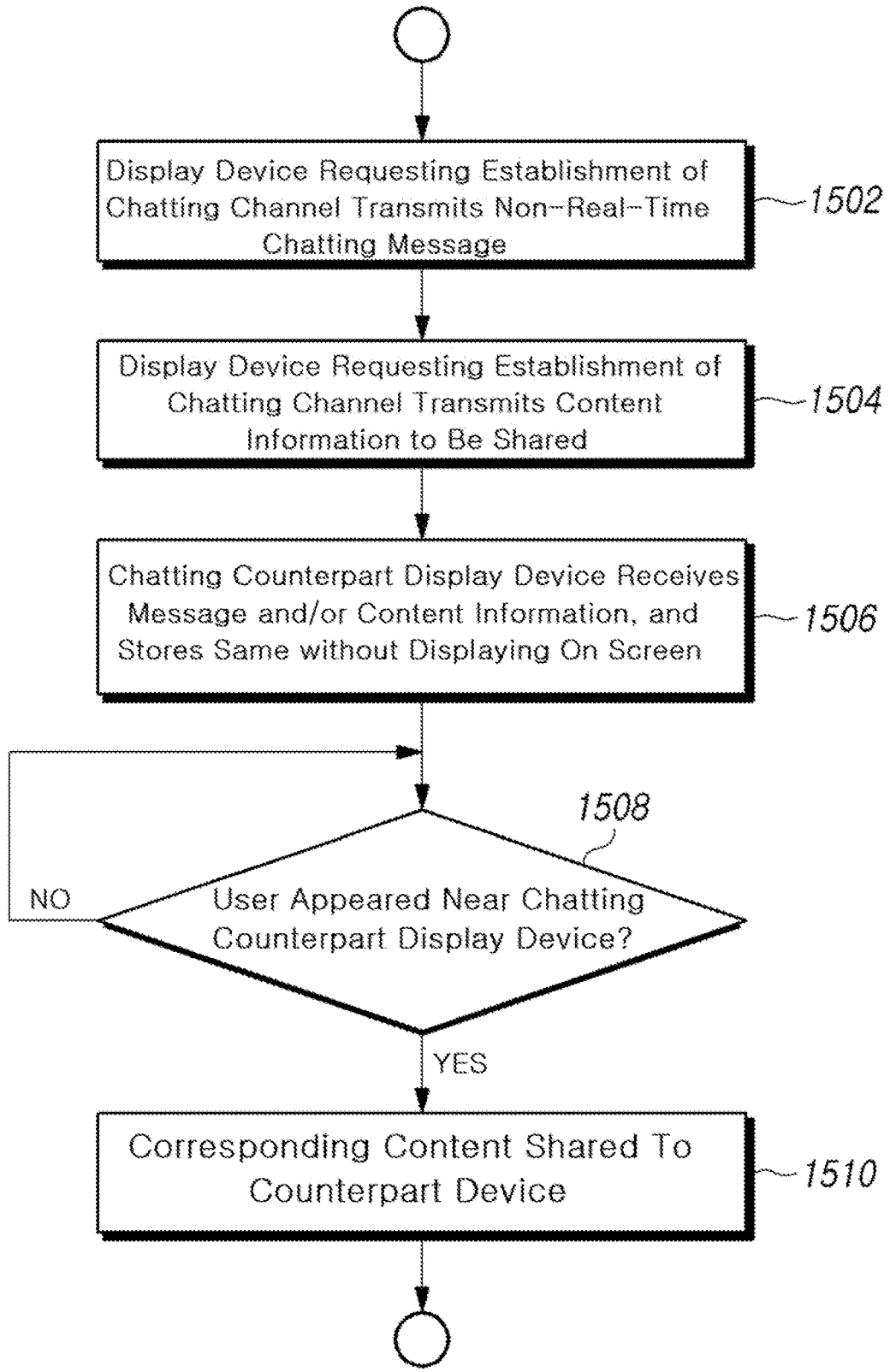
FIG. 15 is a flowchart illustrating a sequence of procedures through which based on a request at a display device, non-real-time chatting between the display device and a counterpart display device is made, in the in-house environment of FIG. 4 according to an embodiment of the present disclosure.

FIG. 15 is a flowchart illustrating a sequence of procedures through which based on a request at a display device (e.g., the display device 406), non-real-time chatting between the display device and a counterpart display device (e.g., the display device 414) is made, in the in-house environment of FIG. 4, according to an embodiment of the present disclosure. According to an embodiment of the present disclosure, for example, the counterpart information related to the chatting channel establishment request obtained from the display device 406 may relate to a specific person, that is, the user Tom, and the display device 414 may be specified as a chatting counterpart device of the non-real-time chatting channel, according to the procedure described above in relation to FIG. 5. The present disclosure is not limited thereto.

According to an embodiment of the present disclosure, in operation 1502, the display device (e.g., the display device 406) requesting to establish a chatting channel may transmit a non-real-time chatting message to the display device (e.g., the display device 414) specified as the chatting counterpart. According to an embodiment of the present disclosure, the user on the display device (e.g., the display device 406) may input a message to be transmitted to the counterpart display device (e.g., the display device 414) in various methods, such as a voice utterance, a gesture, or a key input method, similar to that of the above-described real-time chatting, and the display device may transmit the message input from the user to the counterpart display device. According to an embodiment of the present disclosure, in operation 1504, at a request from the user, to share the content being displayed on the screen of the display device, the display device (e.g., the display device 406) may transmit information of the content to the counterpart display device. According to an embodiment of the present disclosure, the content information to be transmitted may vary depending on the type of content to be shared. For example, when the content to be shared is a terrestrial broadcast content or an OTT content, the corresponding content acquisition information may be transmitted, and in contrast, when it is a unique external input obtained from the display device, the display information itself being reproduced in the corresponding display device may be transmitted.

In operation 1506, the counterpart display device (e.g., the display device 414) may receive the message and/or content information transmitted in the operations 1502 and 1504 and store the same without displaying it on the screen. In operation 1508, the counterpart display device (e.g., the display device 414) may determine whether a user (e.g., the user Tom) has appeared (or returned) in the vicinity of the display device, via the image acquisition module or the motion information acquisition module in the display device. In operation 1508, when it is determined that the user has appeared in the vicinity of the display device, the procedure then proceeds to operation 1510 to display the messages and/or content information received and stored in the previous operation 1506 on the screen of the display device (e.g., the display device 414). According to an embodiment of the present disclosure, for example, a corresponding message and/or content information may be displayed on a center portion of the screen of the display device 414. The present disclosure is not limited thereto.

Figure 16A:
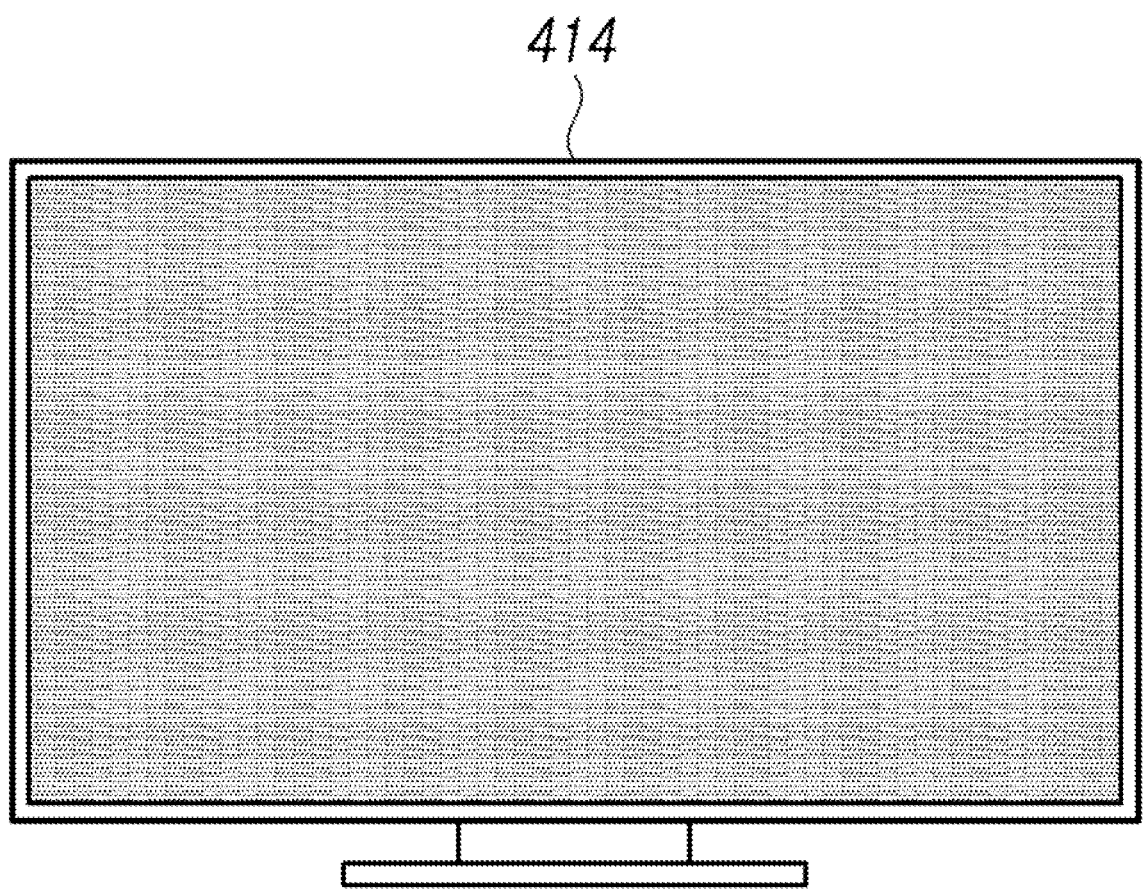
FIGS. 16A and 16B illustrate an exemplary situation in which a message and/or content information is displayed on a screen of a chatting counterpart display device which is requested, according to non-real-time chatting.
Figure 16B:
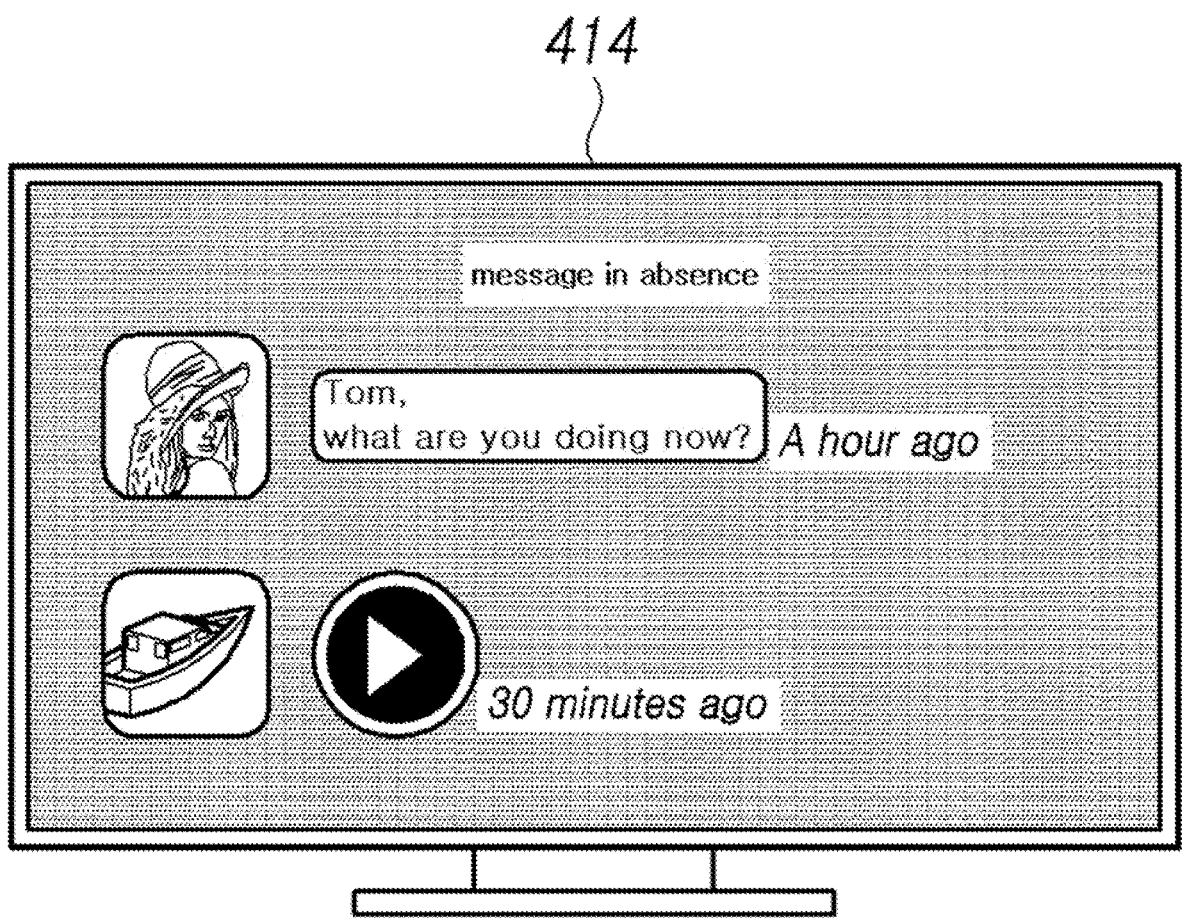

In this context, in FIGS. 16A and 16B is illustrated an exemplary situation in which a message and/or content information is displayed on the screen of a chatting counterpart display device (e.g., the display device 414) which is requested, according to the non-real-time chatting. In FIG. 16A, according to an embodiment of the present disclosure, it is illustrated that the screen of the chatting counterpart display device is in an idle state, while a user (e.g., the user Tom) is not present near the display device (e.g., the display device 414) that is a chatting counterpart device. In FIG. 16B, it is illustrated that when a user (e.g., the user Tom) has appeared near the chatting counterpart display device (e.g., the display device 414), messages and/or content information received during the user's absence are displayed together with its received time information on the screen of the display device (e.g., the display device 414) that has detected it.

In the description of the non-real-time chatting made with reference to FIGS. 15 and 16, it is described that, for example, the chatting counterpart display device 414 has received the message and/or content information from the display device 406 while the user is away from the corresponding display device 414 and then displays the previously received message (including text, voice recording, or video) and/or content information on the corresponding screen, later when the user appears in the vicinity of the display device 414. The present disclosure is not limited thereto. According to another embodiment of the present disclosure, after the chatting counterpart display device 414 receives the message and/or content information from the display device 406 while the user is away from the corresponding display device 414, it may transmit the received message and/or content information to a mobile device (e.g., the user Tom's mobile device) set to be associated in advance with the corresponding display device 414. The present disclosure is not limited thereto.

According to another embodiment of the present disclosure, in addition to the above-described real-time chatting channel and non-real-time chatting channel, a privacy protection mode of chatting channel may be established between the display devices. According to an embodiment of the present disclosure, for example, in the in-house display environment of FIG. 4, when counterpart information related to a chatting channel establishment request from a specific display device (e.g., the display device 406) relates to a specific person (e.g., the user Adam), the specific person (e.g., the user Adam) is present near a specific display device (e.g., the display device 402) among the chatting counterpart candidate devices (402, 404 or 408 to 414), and at the same time, another user (e.g., the user Smith) is further present near the corresponding device (e.g., the display device 402), then the display device 402 may be specified as a chatting counterpart device, wherein a privacy protection mode of chatting channel may be established, instead of the real-time chatting channel, between the display device 402 and the display device 406.

Figure 17A:
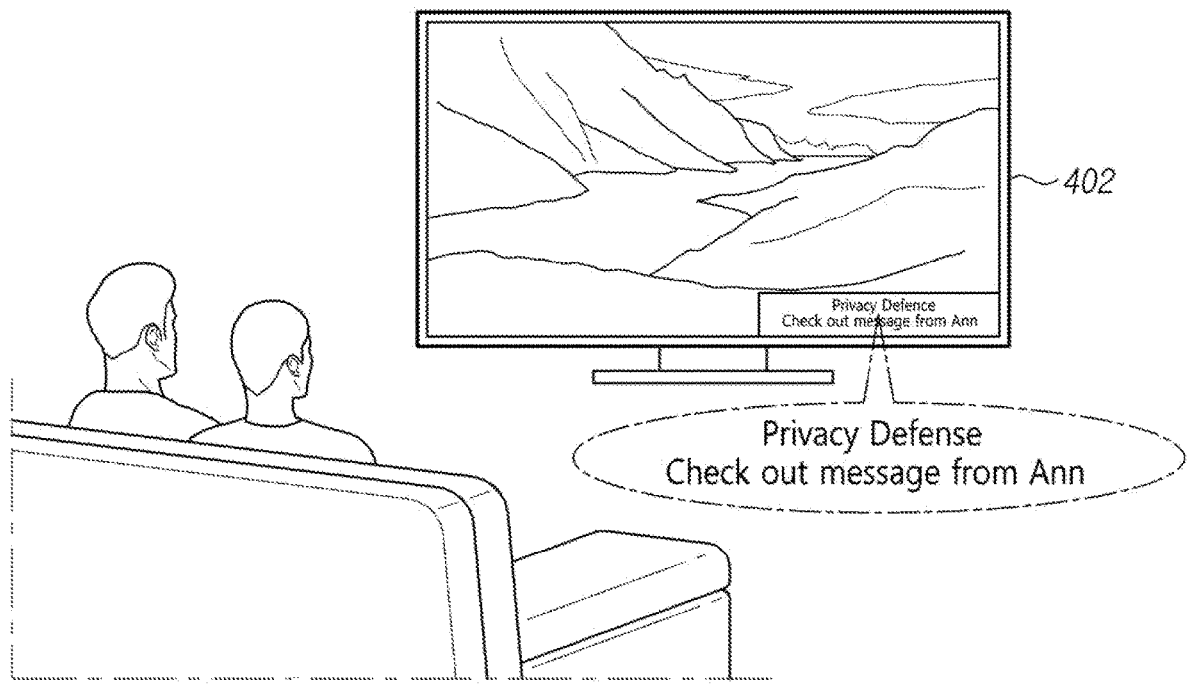
FIGS. 17A and 17B are diagrams illustrating an example of a screen of a display device receiving a chatting channel establishment request, when a chatting channel is established under a privacy protection mode, in an in-house environment of FIG. 4, according to an embodiment of the present disclosure.
Figure 17B:
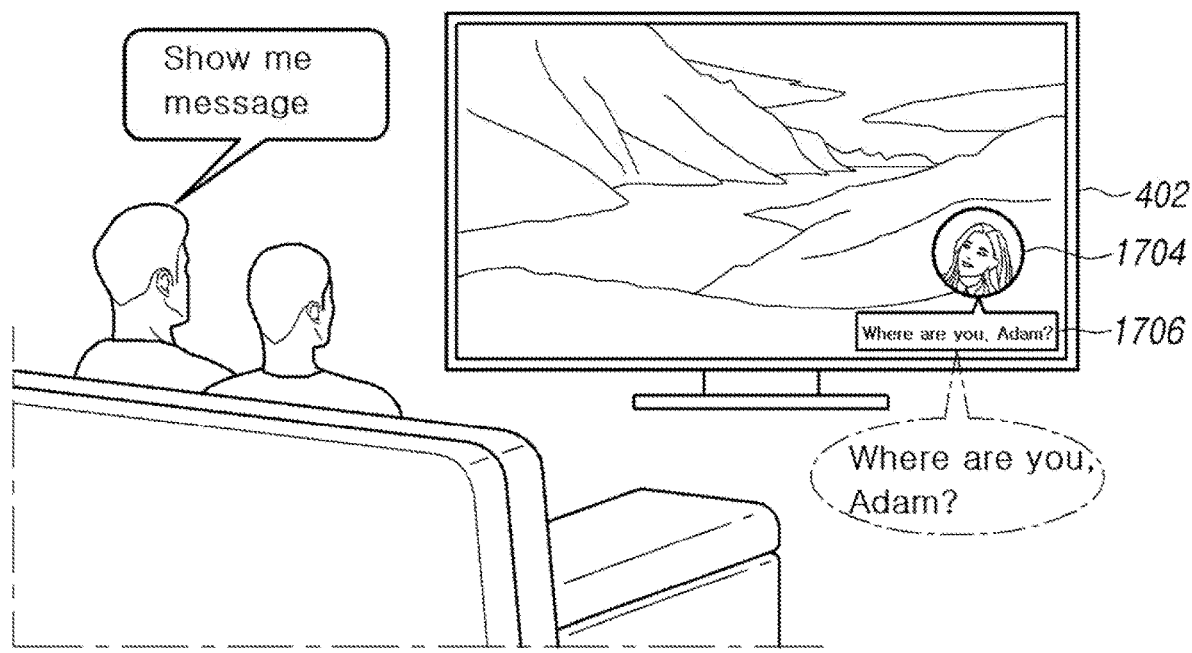

FIGS. 17A and 17B are diagrams illustrating an exemplary screen of a display device (e.g., the display device 402) receiving a chatting channel establishment request, when a chatting channel is established under a privacy protection mode in the in-house environment of FIG. 4, according to an embodiment of the present disclosure. According to an embodiment of the present disclosure, as shown in FIG. 17A, when a privacy protection mode of chatting channel is established, a notification window 1702 informing reception of such a chatting channel establishment request may be displayed on one side (e.g., in the lower right corner in this figure) of the screen of the display device (e.g., the display device 402) that has received the chatting channel establishment request. According to an embodiment of the present disclosure, as shown in this figure, the notification window 1702 may indicate that there is a chatting channel establishment request from a specific user (e.g., the user Ann), but displaying of its specific message content may be omitted. According to another embodiment of the present disclosure, the notification window 1702 may simply display the fact that there exists a chatting channel establishment request and hide information on a chatting counterpart as to who has sent the chatting channel establishment request. The present disclosure is not limited to a specific case thereof. According to another embodiment of the present disclosure, the notification window 1702 may indicate that there exists a chatting channel establishment request for a specific counterpart (e.g., the user Adam) from a specific user (e.g., the user Ann). The present disclosure is not limited to a specific form thereof. As shown in this figure, when a chatting channel establishment request for a specific counterpart (e.g., the user Adam) is received while displaying a multimedia content on the screen of the display device 402, the notification window 1702 may be displayed in a small size in the corner so as not to interfere with the user's viewing experience of the multimedia content being currently played on the screen. Although not specified herein, according to an embodiment of the present disclosure, the notification window 1702 displayed on the screen may disappear with a lapse of a predetermined time duration. The present disclosure is not limited thereto.

Alternatively or additionally, according to an embodiment of the present disclosure, in the situation of FIG. 17A, a command to release the privacy protection mode (e.g., a voice utterance command to show the received message, as illustrated in this figure) may be received, according to any input method, from the counterpart user (e.g., the user Adam) on the display device (e.g., the display device 402) that has received the chatting channel establishment request. According to an embodiment of the present disclosure, once it is received the command to release the privacy protection mode, the privacy protection mode is released, and a real-time chatting channel may be established between the corresponding display devices (e.g., the display device requesting establishment of a chatting channel and the display device receiving such a request). According to an embodiment of the present disclosure, as shown in FIG. 17B, a profile picture 1704 of the user who requested the chatting (e.g., the user Ann) and a message content 1706 received therefrom may be displayed on the screen of the display device (e.g., the display device 402) that received the chatting channel establishment request.

According to an embodiment of the present disclosure, a direct connection by a prior agreement between both display devices of certain display devices may be registered in advance. As described above with reference to FIGS. 4 to 8, for example, according to step-by-step procedures defined for each voice utterance, gesture, or key input method, a chatting channel establishment request may be input on a display device and it may be identified whether there is a person near the display device designated as a chatting counterpart, and then, a real-time or non-real-time chatting channel may be established between the display device requesting establishment of a chatting channel and its chatting counterpart display device. According to an embodiment of the present disclosure, a real-time chatting channel may be directly established between both the display devices for which a direct connection is pre-registered, by a predetermined specific input, without such step-by-step procedures. For example, a real-time chatting channel may be quickly established by a simple input between a parent and his/her child in their own home or room, using the display devices at their own respective locations, without going through complicated procedures.

Figure 18A:
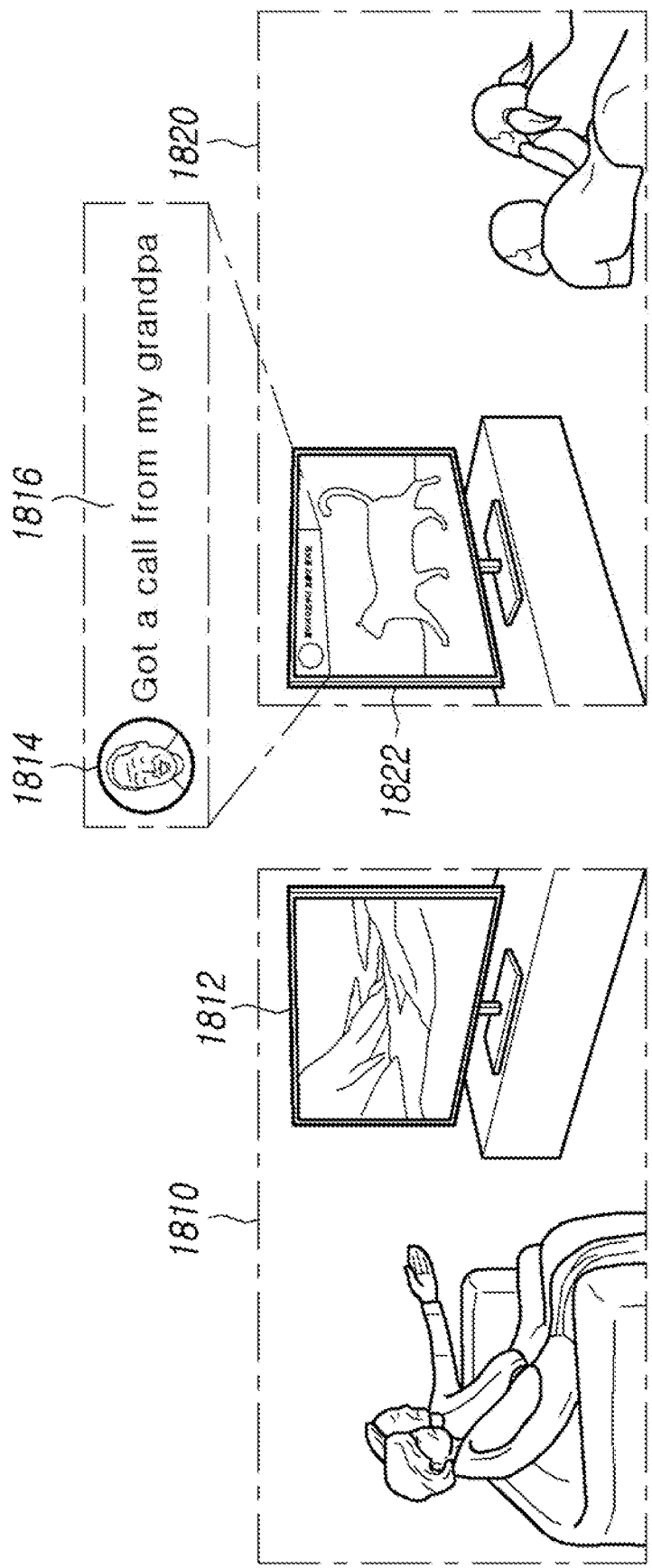
FIGS. 18A and 18B illustrate an exemplary situation in which a real-time chatting channel is established between display devices which are registered for direct connection, according to an embodiment of the present disclosure.
Figure 18B:
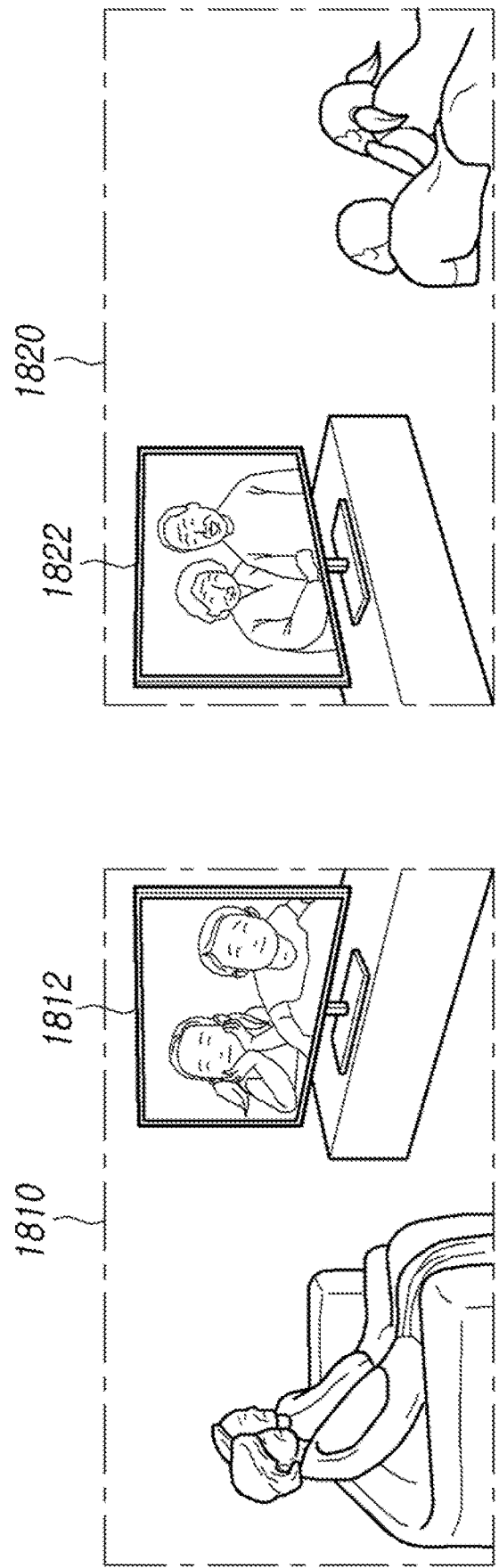

FIGS. 18A and 18B illustrate an exemplary situation in which a real-time chatting channel is established between display devices 1812 and 1822 which are registered for direct connection, according to an embodiment of the present disclosure. As shown in FIG. 18A, for example, a grandmother and a grandfather may be watching a multimedia content on a screen of a display device 1812 installed in a space 1810, and children may be watching a display device 1822 installed in a space 1820. In FIG. 18A, it is shown, for example, a situation in which the grandfather in the space 1810 calls a direct connection by a predetermined gesture, while watching the content on the screen of the display device 1812. Although not specified in this figure, such a direct connection may be registered between the display devices 1812 and 1822 in advance, and a predetermined input to call such a direct connect (e.g., a gesture input of a specific voice utterance, a specific gesture, or a specific key input defined in advance) may be set in advance. As shown in FIG. 18A, once the display device 1812 detects the input to call such a direct connection (e.g., a predetermined gesture input), the display device 1812 and the display device 1822 may be connected to each other to establish a real-time chatting channel immediately without any additional process.

According to an embodiment of the present disclosure, when a real-time chatting channel between the display devices 1812 and 1822 is established by a direct connection call, as shown in FIG. 18A, a notification indicating that a real-time chatting channel has been established with the display device 1812 may be provided on the screen of the display device 1822 in which the content is currently being played. As shown, in relation to the display device 1812, a profile picture 1814 of a pre-registered user, for example, a grandfather, and a text 1816 notifying that a call has received from the grandfather may be displayed, and the present disclosure is limited thereto. According to another embodiment of the present disclosure, various indications informing that a real-time chatting channel has been established between the display devices 1812 and 1822 may be displayed on the screen of the display device 1822. Although not shown in this figure, according to an embodiment of the present disclosure, when a direct connection call has been made, a notification informing that a real-time chatting channel by a direct connection is established between the display devices 1812 and 1822 may be also provided on the screen of the display device 1812.

This drawing and its related description relate to a circumstance in which a real-time chatting channel is established between the display device 1812 and the display device 1822 by a direct connection call from the display device 1812 side, but the present disclosure is limited thereto. According to another embodiment of the present disclosure, such a real-time chatting channel may be established between the display device 1812 and the display device 1822 by a direct connection call from the display device 1822 side. Alternatively or additionally, although this drawing and its related description relate to a circumstance in which a direct connection is made between the display device 1812 and the display device 1822 while a content is being displayed on the respective screens. The disclosure is not limited thereto. According to another embodiment of the present disclosure, when a predetermined input to call a direct connection is made even while each display device is in an idle state, the direct connection between the two display devices and a real-time chatting channel may be established accordingly.

According to an embodiment of the present disclosure, when a real-time chatting channel is established between the display devices 1812 and 1822 according to the setting registered in advance in relation to the direct connection, image information captured by an image acquisition module (e.g., a camera) in a counterpart display device may be displayed on the screen of each display device. The present disclosure is not limited thereto. For example, according to an embodiment of the present disclosure, as shown in FIG. 18B, when a real-time chatting channel is established by the direct connection between the display devices 1812 and 1822 according to the setting registered in advance, a still image or a moving picture obtained by the image acquisition module in the display device 1822 may be displayed on the screen of the display device 1812. Likewise, according to an embodiment of the present disclosure, when a real-time chatting channel is established by the direct connection between the display devices 1812 and 1822 according to the pre-registered setting, a still image or a moving image captured by the image acquisition module of the display device 1812 may be displayed on the screen of the display device 1822. However, the present disclosure is not limited to a specific form, and an indication for real-time chatting may be displayed in a small size on one side of each screen of the display devices 1812 and 1822 with the content being displayed as it is.

The present disclosure has been mainly described focusing on the circumstance of establishing a chatting channel between a plurality of display devices in an in-house environment. However, the present disclosure is not limited thereto. According to various embodiments of the present disclosure, a chatting channel may be established between various display devices under the in-house or outdoor environment registered in advance with respect to each other, and each user may have a chat with another user through a screen of a nearby display device. In the present disclosure, it has been mainly described focusing on the case of text chatting using each screen of the display devices. However, the present disclosure is not limited thereto. Various embodiments of the present disclosure may also be applied to voice chatting and video calls through those display devices.

As used in the present disclosure, the term "real-time chatting" and "non-real-time chatting" may only refer to whether an input message to be transmitted to a counterpart from a display device is immediately displayed on a screen of the counterpart display device without any additional conditions, or whether the message is displayed on the corresponding screen on the premise that any additional condition is met in the counterpart's display device (e.g., whether a person has returned near the counterpart's display device), and it does not intended to refer to the time required for actual message delivery.

The various embodiments and terms used herein are not intended to limit the technical features described herein to specific embodiments and should be understood to include various modifications, equivalents, or substitutes of the embodiment. For example, an element expressed in a singular should be understood as a concept including a plurality of elements unless the context clearly means only the singular. It should be understood that the term 'and/or' as used herein is intended to encompass any and all possible combinations of one or more of the enumerated terms. As used in the present disclosure, the terms such as 'comprise (s)', 'include(s)' 'have/has', 'configured of', etc. are only intended to designate that the features, components, parts, or combinations thereof described in the present disclosure exist, and the use of these terms is not intended to exclude the possibility of the presence or addition of one or more other features, components, parts, or combinations thereof. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "the first", "the second", or "first", or "second" may be used simply to distinguish a corresponding component from another corresponding component, and do not limit the corresponding components in view of other aspect (e.g., importance or order).

The term "module" or "unit" used in various embodiments of the present document may include a unit implemented in hardware, software, or firmware and be used interchangeably with terms such as e.g., logic, logic block, component, or circuitry, for example. The module or unit may be a minimum unit or a part of the integrally configured component or the component that performs one or more functions. For example, according to an embodiment, the module or unit may be implemented in the form of an application-specific integrated circuit (ASIC).

The program executed by the display device described through this document may be implemented as a hardware component, a software component, and/or a combination of the hardware component and the software component. The program may be executed by any system capable of executing computer readable instructions.

Software may include a computer program, code, instructions, or a combination of one or more of these, and independently or in combination (collectively) can command the processing unit. The software may be implemented as a computer program including instructions stored in a computer-readable storage medium. The computer-readable storage medium may include, for example, a magnetic storage medium (e.g., read-only memory (ROM), random-access memory (RAM), floppy disk, hard disk, etc.), an optically readable medium (e.g., compact disc ROM (CD-ROM), digital versatile disc (DVD), etc.) and the like. The computer-readable storage medium may be distributed among network-connected computer systems, so that the computer-readable code can be stored and executed in a distributed manner. The computer program may be distributed (e.g., downloaded or uploaded) by online, either via an application store (e.g., Play Store™) or directly between two user devices (e.g., smartphones). In the case of online distribution, at least a part of the computer program product may be temporarily stored or temporarily generated in a machine-readable storage medium such as a memory of a server of a manufacturer, a server of an application store, or a relay server.

According to various embodiments, each component (e.g., module or program) of the above-described components may include a singular or a plurality of entities, and some of the plurality of entities may be separated and placed into other components. According to various embodiments, one or more components or operations among the above-described corresponding components may be omitted, or one or more other components or operations may be added thereto. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly or heuristically, or one or more of the operations may be executed in a different order or omitted, or one or more other operations may be added thereto.

What is claimed is:

1. A display device, comprising:
    a content receiving circuit configured to receive a content signal;
    a screen configured to display the content signal;
    a communication interface configured to communicate with other devices via a communication network;
    a memory storing one or more instructions; and
    a processor configured to execute the one or more instructions to:
        obtain, from a user, a chatting channel establishment request and counterpart information for establishing a chatting channel;
        identify a counterpart display device based on the counterpart information;
        obtain an availability state of a chatting counterpart on the counterpart display device;
        perform real-time chatting between the user and the chatting counterpart on the counterpart display device, based on the availability state of the chatting counterpart on the counterpart display device allowing the real-time chatting; and
        perform non-real-time chatting between the user and the chatting counterpart on the counterpart display device, based on the availability state of the chatting counterpart on the counterpart display device not allowing the real-time chatting,
        wherein the non-real-time chatting comprises storing and preventing display of a non-real-time message on the counterpart display device based on the chatting counterpart not being present in a vicinity of the counterpart display de vice.

2. The display device of claim 1, further comprising a voice acquisition circuit configured to receive, from the user, a voice utterance input including the chatting channel establishment request and the counterpart information.

3. The display device of claim 1, wherein the counterpart information comprises identification information that identifies at least one of a person from among a plurality of predetermined persons and a device from among a plurality of predetermined devices.

4. The display device of claim 3, further comprising at least one of an image acquisition circuit configured to detect an image signal surrounding the display device, a motion information acquisition circuit configured to detect a motion occurring in a vicinity of the display device, and a key input acquisition circuit configured to obtain a key input, and
    wherein the processor is further configured to execute the one or more instructions to obtain the chatting channel establishment request, based on a gesture input obtained from at least one of the image signal surrounding the display device and the motion occurring in the vicinity of the display device, or the key input.

5. The display device of claim 4, wherein the processor is further configured to execute the one or more instructions to:
    control the screen to display a list of entries respectively indicating each person of the plurality of predetermined persons or each device of the plurality of predetermined devices; and
    obtain the counterpart information from a selected entry from the list of entries according to the gesture input or the key input from the user.

6. The display device of claim 1, wherein the processor is further configured to execute the one or more instructions to:
    when the chatting channel establishment request comprises a request for a predetermined default device, identify the predetermined default device as the counterpart display device and set the availability state of the chatting counterpart on the counterpart display device to a real-time chatting available state.

7. The display device of claim 1, wherein the processor is further configured to execute the one or more instructions to:
    when the counterpart information includes identification information of a person from among a plurality of predetermined persons, determine whether the person is located in a vicinity of a device of a plurality of predetermined devices by inquiring, via the communication interface, each device of the plurality of predetermined devices whether the person is located in the vicinity of that device; and
    based on a determination that the person is located in the vicinity of the device, identify the device as the counterpart display device and set the availability state of the chatting counterpart on the counterpart display device to a real-time chatting available state.

8. The display device of claim 7, wherein the processor is further configured to execute the one or more instructions to:
    based on a determination that the person is not located in a vicinity of the plurality of predetermined devices, identify a predetermined device related to the person from among the plurality of predetermined devices as the counterpart display device and set the availability state of the chatting counterpart on the counterpart display device to a real-time chatting unavailable state.

9. The display device of claim 1, wherein the processor is further configured to execute the one or more instructions to:
    when the counterpart information includes identification information of a predetermined device from among a plurality of predetermined devices, identify the predetermined device as the counterpart display device;
query, via the communication interface, to the predetermined device, whether a person is located in a vicinity of the device; and
when a first response that the person is located in the vicinity of the predetermined device is received from the device via the communication interface, set the availability state of the chatting counterpart on the counterpart display device to a real-time chatting available state, and when a second response that the person is not located in the vicinity of the predetermined device is received, set the availability state of the chatting counterpart to a real-time chatting unavailable state.

10. The display device of claim 1, further comprising at least one of a voice acquisition circuit configured to receive a voice utterance input from the user, an image acquisition circuit configured to detect an image signal surrounding the display device, a motion information acquisition circuit configured to detect a motion generated in a vicinity of the display device, and a key input acquisition circuit configured to obtain a key input; and
wherein the processor is further configured to execute the one or more instructions to:
transmit, to the counterpart display device, a first text message generated based on the voice utterance input received by the voice acquisition circuit; or
control the screen to display a plurality of messages, and transmit, to the counterpart display device, a second text message selected from the plurality of messages, based on a gesture input obtained from at least one of the image signal detected by the image acquisition circuit or the motion detected by the motion information acquisition circuit, and the key input obtained from the key input acquisition circuit.

11. The display device of claim 1, wherein the processor is further configured to execute the one or more instructions to:
while performing the real-time chatting with the chatting counterpart on the counterpart display device:
when the content signal is being displayed on the screen, control the screen to display information of the real-time chatting outside a displayed area of the content signal or in an edge area of the content signal; and
when the content signal is not being displayed on the screen, control the screen to display the information of the real-time chatting in a center portion of the screen.

12. The display device of claim 11, wherein the information of the real-time chatting displayed on the screen comprises a chatting message from the user, an image representing the user, a counterpart chatting message from the chatting counterpart, and a counterpart image representing the chatting counterpart or the counterpart display device.

13. The display device of claim 1, wherein the processor is further configured to execute the one or more instructions to:
while the user performs the real-time chatting with the chatting counterpart on the counterpart display device:
obtain, from the user, a sharing request to share the content signal being displayed on the screen with the counterpart display device; and
when an intention to accept the sharing request from the counterpart display device is obtained, perform an operation to share the content signal.

14. The display device of claim 13, wherein the operation to share the content signal comprises to:

when the content signal is a terrestrial broadcast content signal or an Over-the-Top (OTT) content signal, transmit information for obtaining the terrestrial broadcast content signal or the OTT content signal to the counterpart display device; and
when the content signal is not the terrestrial broadcast content signal and is not the OTT content signal, stream the content signal being displayed on the screen to the counterpart display device.

15. The display device of claim 1, further comprising an image acquisition circuit configured to obtain an image signal surrounding the display device; and
wherein the processor is further configured to execute the one or more instructions to:
in response to a request from another external display device via the communication interface, determine whether a person is located in a vicinity of the display device, based on the image signal obtained by the image acquisition circuit; and
transmit, via the communication interface to the another external display device, a result of a determination of whether the person is located in the vicinity of the display device.

16. The display device of claim 1, wherein the processor is further configured to execute the one or more instructions to:
determine whether a plurality of persons are located in a vicinity of the display device, according to a predetermined manner; and
based on a determination that the plurality of persons are located in the vicinity of the display device, when a chatting message for the user on the display device is received from another external display device via the communication interface, control the screen to display an indication that the chatting message has been received with its content being hidden.

17. The display device of claim 1, wherein the processor is further configured to execute the one or more instructions to:
receive, via the communication interface, a chatting message for the non-real-time chatting from another external display device;
determine whether a person is present in a vicinity of the display device, according to a predetermined manner; and
display the chatting message on the screen based on a determination that the person is present in the vicinity of the display device.

18. A method for supporting chatting between a plurality of display devices connected over a communication network, the method being performed by a computer, the method comprising:
obtaining, from a first display device from among the plurality of display devices, a chatting channel establishment request indicating at least one of a person from among a plurality of pre-registered persons and a second display device from among the plurality of display devices;
when the chatting channel establishment request indicates the person from among the plurality of pre-registered persons:
searching the plurality of display devices for a display device that is located in a vicinity of the person;
based on the searching resulting in identifying that the searched display device is located in the vicinity of the person, supporting real-time chatting between the first display device and the searched display device; and based on the searching resulting in not identifying that the searched display device is located in the vicinity of the person, supporting non-real-time chatting between the first display device and another device from among the plurality of display devices that is associated with the person; and when the chatting channel establishment request indicates the second display device from among the plurality of display devices:

determining whether a person is located in a vicinity of the second display device;

based on determining that the person is located in the vicinity of the second display device, supporting the real-time chatting between the first display device and the second display device; and based on determining that the person is not located in the vicinity of the second display device, supporting the non-real-time chatting between the first display device and the second display device, wherein the supporting of the non-real-time chatting comprises storing and preventing display of a non-real-time message on the second display device based on the person not being present in a vicinity of the second display device.

19. The method according to claim 18, wherein the supporting of the real-time chatting comprises displaying a chatting message obtained from both display devices related to the real-time chatting on each screen of the display devices.

20. The method according to claim 18, wherein the supporting of the non-real-time chatting comprises displaying a chatting message obtained from the first display device on a screen of a counterpart device of the non-real-time chatting, based on determining that the person is located in a vicinity of the counterpart device.

21. The display device of claim 1, wherein the processor is further configured to execute the one or more instructions to:

determine the availability state of the chatting counterpart on the counterpart display device based on a determination by a sensor of the counterpart display device indicating whether the chatting counterpart appears in the vicinity of the counterpart display device.

\* \* \* \* \*